United States Patent
Ozawa et al.

(10) Patent No.: US 10,416,606 B2
(45) Date of Patent: Sep. 17, 2019

(54) DEVELOPING CARTRIDGE INCLUDING DEVELOPING COUPLING, AND IMAGE FORMING APPARATUS INCLUDING MAIN BODY COUPLING CONNECTABLE TO DEVELOPING COUPLING

(71) Applicant: BROTHER KOGYO KABUSHIKI KAISHA, Nagoya-shi, Aichi-ken (JP)

(72) Inventors: Atsushi Ozawa, Aichi-ken (JP); Yasushi Okabe, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 16/126,172

(22) Filed: Sep. 10, 2018

(65) Prior Publication Data

US 2019/0004472 A1 Jan. 3, 2019

Related U.S. Application Data

(63) Continuation of application No. PCT/JP2016/078647, filed on Sep. 28, 2016.

(30) Foreign Application Priority Data

Mar. 11, 2016 (JP) .................. 2016-048887

(51) Int. Cl.
| | | |
|---|---|---|
| G03G 21/16 | (2006.01) | |
| F16D 3/40 | (2006.01) | |
| F16D 3/44 | (2006.01) | |
| G03G 15/08 | (2006.01) | |
| F16D 3/26 | (2006.01) | |
| G03G 21/18 | (2006.01) | |

(52) U.S. Cl.
CPC ......... *G03G 21/1647* (2013.01); *F16D 3/265* (2013.01); *F16D 3/40* (2013.01);
(Continued)

(58) Field of Classification Search
CPC ........ G03G 21/1647; G03G 2221/1657; F16D 3/40; F16D 3/44
See application file for complete search history.

(56) References Cited

U.S. PATENT DOCUMENTS 8,874,004 B2 * 10/2014 Takasaka ............... F16D 1/10
                                                              399/227
2009/0317134 A1   12/2009 Miyabe et al.
(Continued)

FOREIGN PATENT DOCUMENTS

JP       5-341589 A    12/1993
JP     2001-225652 A    8/2001
(Continued)

OTHER PUBLICATIONS

International Search Report and Written Opinion issued in related PCT/JP2016/078647, dated Nov. 1, 2016.
(Continued)

*Primary Examiner* — Erika J Villaluna
(74) *Attorney, Agent, or Firm* — Merchant & Gould P.C.

(57) ABSTRACT

A developing cartridge includes: a developing roller rotatable about a first axis extending in a first direction; a developing roller gear rotatable together with the developing roller; a coupling gear rotatable about a second axis extending in the first direction; and a joint rotatable together with the coupling gear. The coupling gear is meshingly engaging with the developing roller gear. The joint is pivotally movable relative to the coupling gear about a third axis extending in a second direction. The joint includes: a first protrusion extending in a first radial direction; and a second protrusion extending in a second radial direction opposite to the first radial direction. The second protrusion is positioned away from and is aligned with the first protrusion in a diametrical direction including the first radial direction and the second
(Continued)

radial direction. The second direction crosses the first radial direction and the second radial direction.

11 Claims, 20 Drawing Sheets

(52) U.S. Cl.
CPC ............... *F16D 3/44* (2013.01); *G03G 15/08* (2013.01); *G03G 21/16* (2013.01); *G03G 15/0865* (2013.01); *G03G 21/18* (2013.01)

(56) References Cited

U.S. PATENT DOCUMENTS

| | | |
|---|---|---|
| 2009/0317135 A1 | 12/2009 | Miyabe et al. |
| 2011/0005881 A1 | 3/2011 | Okabe |
| 2013/0322924 A1 | 12/2013 | Kondo et al. |

FOREIGN PATENT DOCUMENTS

| | | |
|---|---|---|
| JP | 2011-59338 A | 3/2011 |
| JP | 2013-57849 A | 3/2013 |
| JP | 2013-122537 A | 6/2013 |
| JP | 2013-250342 A | 12/2013 |
| JP | 2016-27419 A | 2/2016 |

OTHER PUBLICATIONS

International Preliminary Report on Patentability issued in related International Patent Application No. PCT/JP2016/078647, dated Sep. 20, 2018.

\* cited by examiner

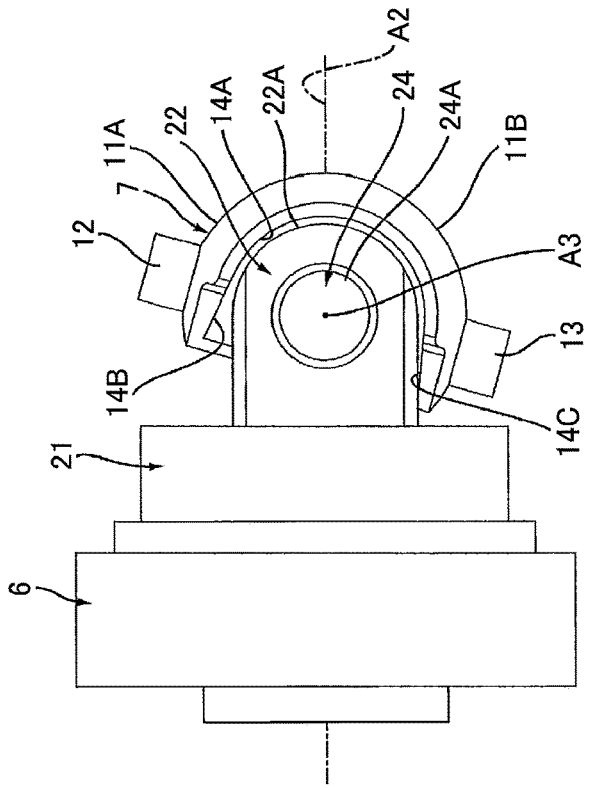
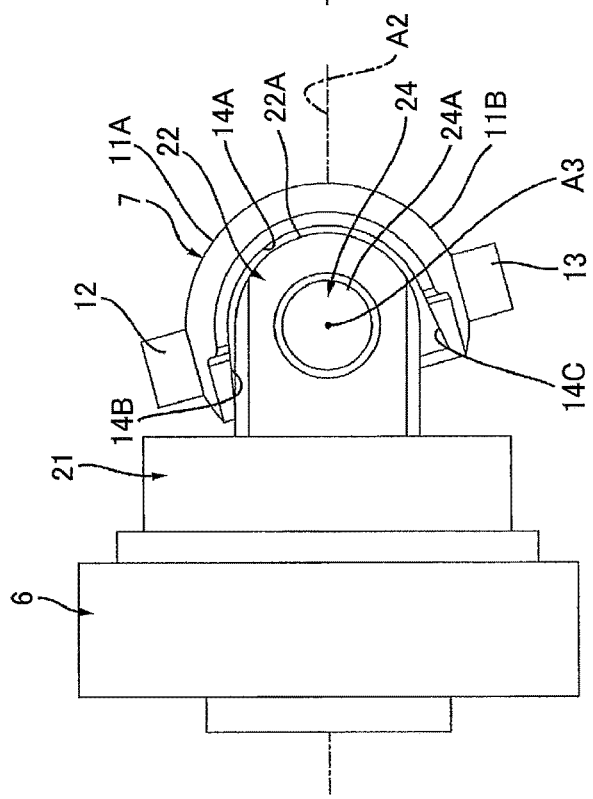

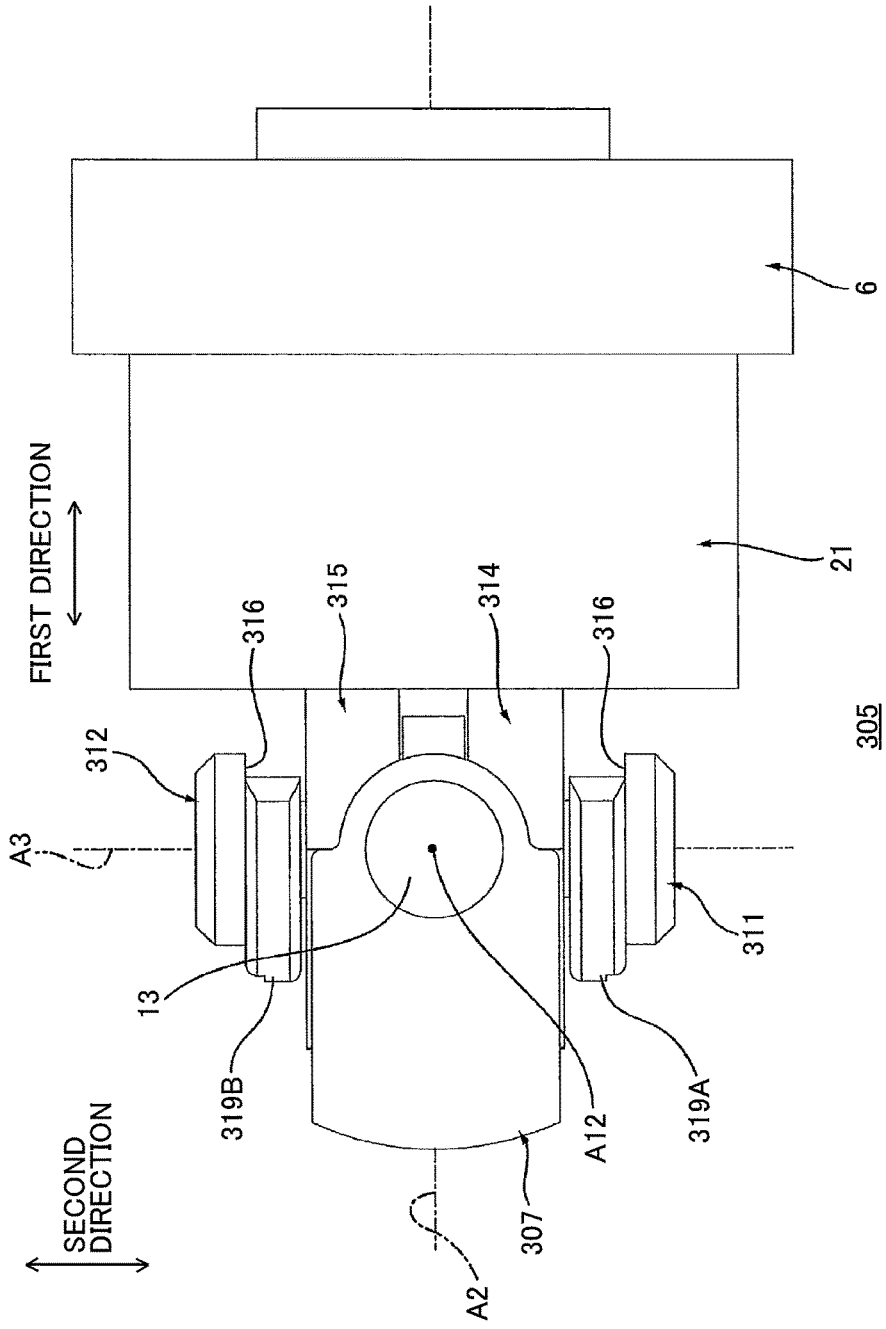

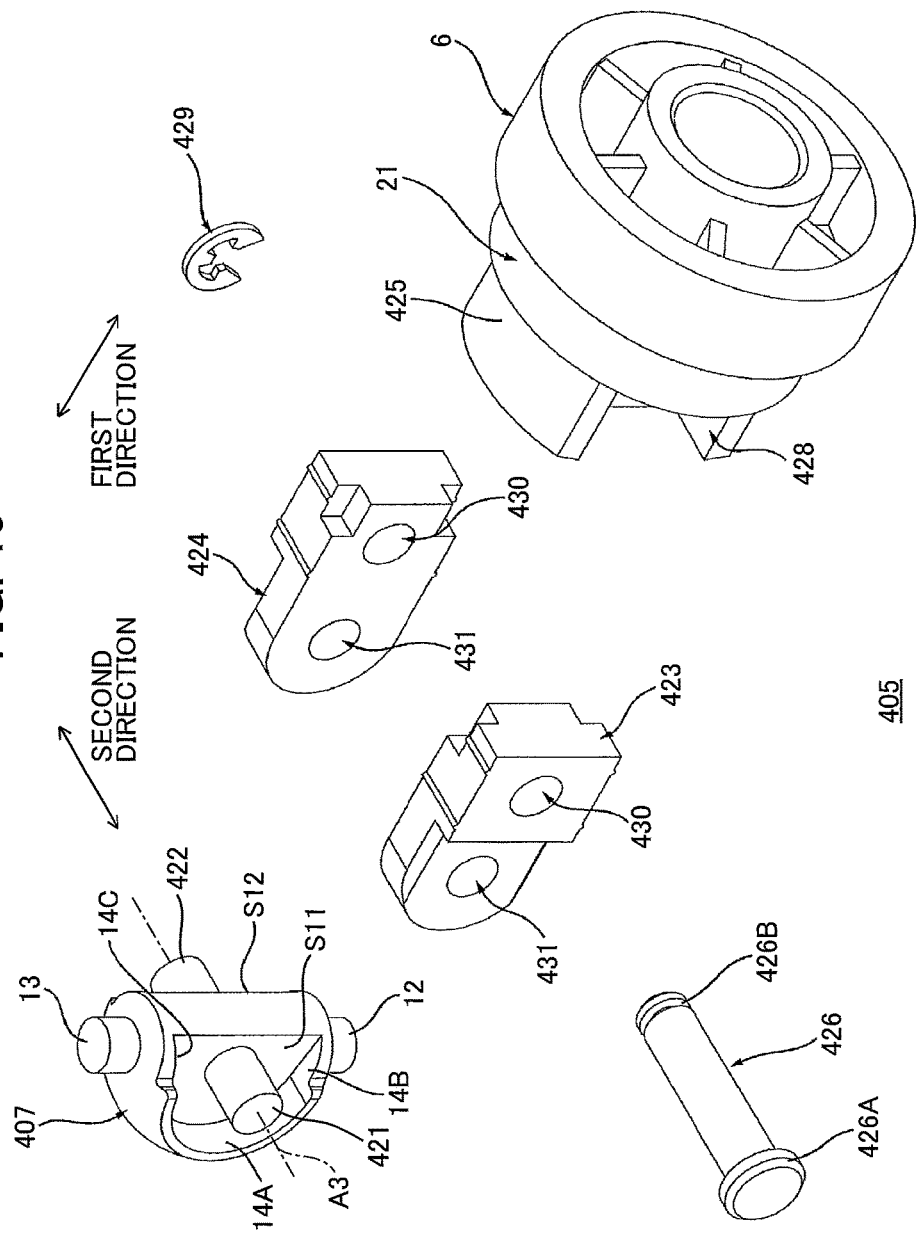

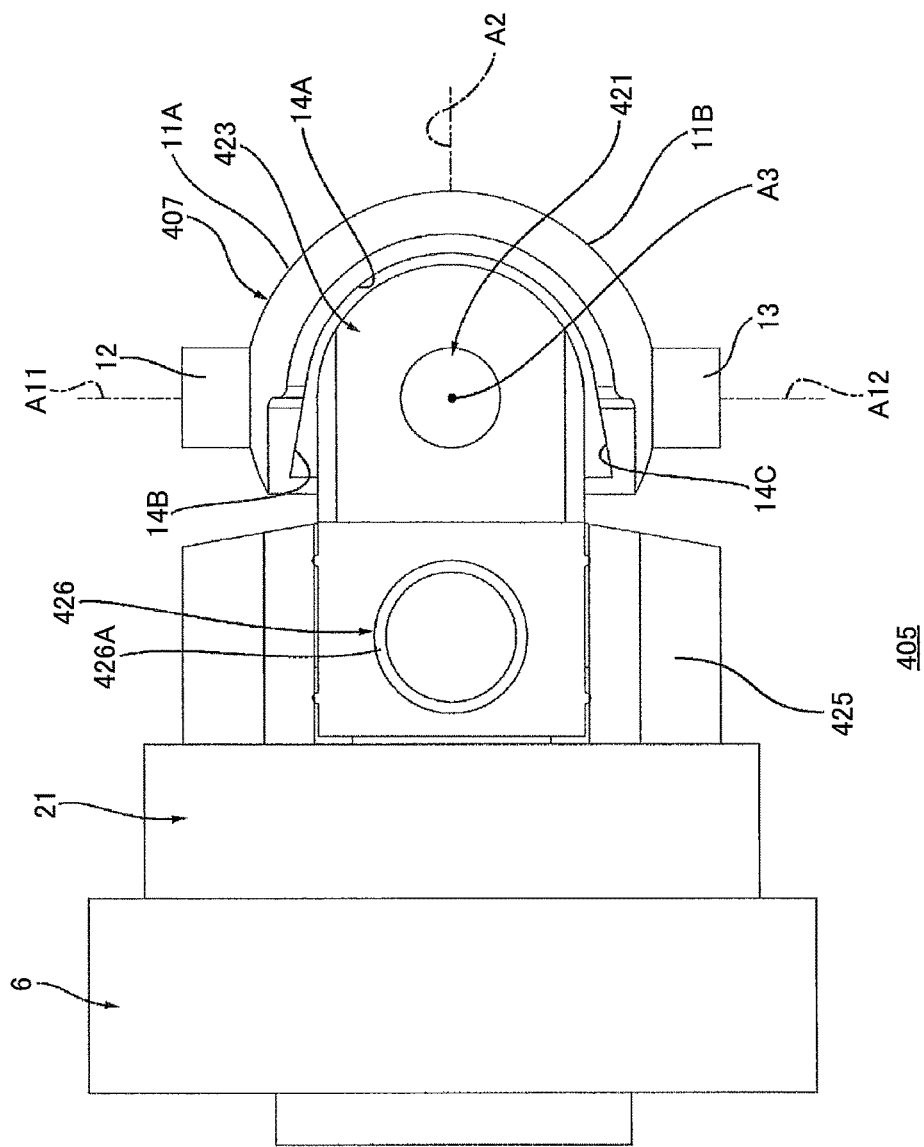

DEVELOPING CARTRIDGE INCLUDING DEVELOPING COUPLING, AND IMAGE FORMING APPARATUS INCLUDING MAIN BODY COUPLING CONNECTABLE TO DEVELOPING COUPLING

CROSS REFERENCE TO RELATED APPLICATION

This is a by-pass continuation application of International Application No. PCT/JP2016/078647 filed Sep. 28, 2016 claiming priority from Japanese Patent Application No. 2016-048887 filed Mar. 11, 2016. The entire contents of the International Application and the priority application are incorporated herein by reference.

TECHNICAL FIELD

The present disclosure relates to a developing cartridge and an image forming apparatus to which the developing cartridge is attachable.

BACKGROUND

Conventionally, a developing cartridge including a developing roller and a coupling for receiving driving force from an image forming apparatus is well known in the art. As the coupling receives driving force from the image forming apparatus, the developing roller rotates. Prior art discloses an image forming apparatus including a developing drive transmission member that includes a developing drive gear and a reciprocating member. The reciprocating member of the developing drive transmission member constitutes a universal joint.

SUMMARY

It is an object of the present disclosure to provide a developing cartridge and an image forming apparatus each including a component(s) constituting a universal joint.

In order to attain the above and other objects, according to one aspect, the disclosure provides a developing cartridge including: a developing roller; a developing roller gear; a coupling gear; and a joint. The developing roller is rotatable about a first axis extending in a first direction. The developing roller included one end portion in the first direction. The developing roller gear is positioned at the one end portion of the developing roller and is rotatable together with the developing roller. The coupling gear is rotatable about a second axis extending in the first direction. The coupling gear meshingly engages with the developing roller gear. The joint is rotatable together with the coupling gear and is positioned opposite to the developing roller with respect to the coupling gear in the first direction. The joint is pivotally movable relative to the coupling gear about a third axis extending in a second direction. The joint includes: a first protrusion; and a second protrusion. The first protrusion extends in a first radial direction of the coupling gear. The second protrusion is positioned away from the first protrusion and is aligned with the first protrusion in a diametrical direction of the coupling gear. The second protrusion extends in a second radial direction of the coupling gear. The second radial direction is directed to a direction opposite to the first radial direction. The diametrical direction includes the first radial direction and the second radial direction. The second direction crosses the first radial direction and the second radial direction.

According to another aspect, the disclosure provides an image forming apparatus to which the above developing cartridge is detachably attachable. The image forming apparatus includes: a second joint; a universal joint; and a driving force transmission member. The second joint is connectable to the joint of the developing cartridge and is rotatable together with the joint. The second joint includes: a first recess into which the first protrusion of the developing cartridge is fitted; and a second recess into which the second protrusion of the developing cartridge is fitted. The universal joint is rotatable upon rotation of the second joint. The driving force transmission member is configured to transmit driving power for rotating the universal joint.

BRIEF DESCRIPTION OF THE DRAWINGS

The particular features and advantages of the embodiment(s) as well as other objects will become apparent from the following description taken in connection with the accompanying drawings, in which:

FIG. 6A is a view illustrating the developing coupling, and particularly illustrating a first position of a joint of the developing coupling;

FIG. 6B is a view illustrating the developing coupling, and particularly illustrating a second position of the joint;

FIG. 14 is a side view of the developing coupling of the developing cartridge according to the fourth embodiment as viewed in the third direction;

FIG. 15 is an exploded perspective view of a developing coupling of a developing cartridge according to a fifth embodiment;

FIG. 16 is a side view of the developing coupling of the developing cartridge according to the fifth embodiment as viewed in the second direction;

DETAILED DESCRIPTION

First Embodiment

Hereinafter, an image forming apparatus 200 and a developing cartridge 1 according to a first embodiment of the present disclosure will be described with reference to FIGS. 1 through 10.

<1. Overall of Image Forming Apparatus 200>

Figure 1:
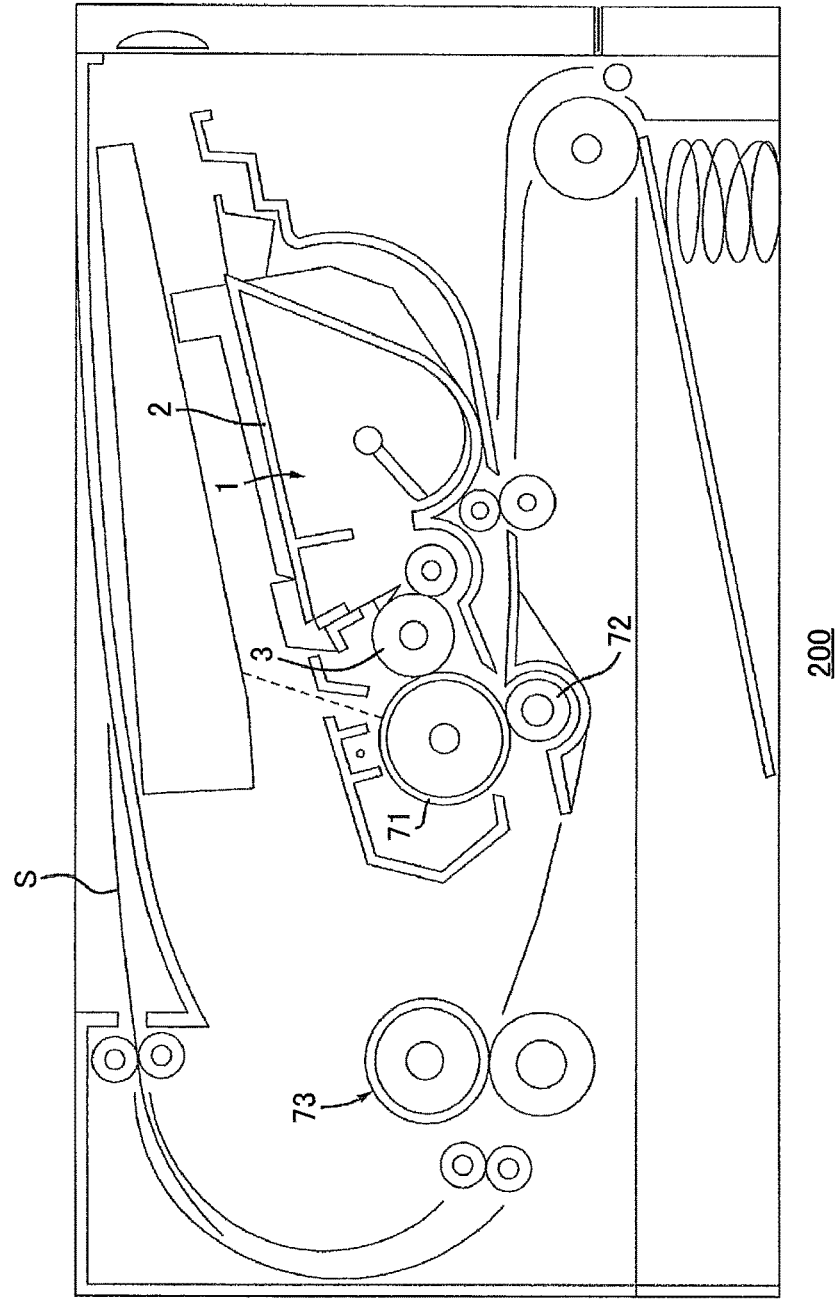
FIG. 1 is a schematic diagram of an image forming apparatus and a developing cartridge according to a first embodiment of the present disclosure.

Overall of the image forming apparatus 200 will be described with reference to FIG. 1.

The image forming apparatus 200 is configured to form an image on a sheet S using developing agent. More specifically, the image forming apparatus 200 allows the developing cartridge 1 accommodating developing agent therein to be attachable thereto and detachable therefrom.

The image forming apparatus 200 includes a photosensitive drum 71, a transfer roller 72, and a fixing unit 73. Developing agent is supplied from the developing cartridge 1 to an outer circumferential surface of the photosensitive drum 71 to form a developing agent image thereon. The transfer roller 72 is configured to transfer the developing agent image that has been formed on the outer circumferential surface of the photosensitive drum 71 to the sheet S. The fixing unit 73 is configured to heat the sheet S onto which the developing agent image is transferred to fix the developing agent image to the sheet S.

Note that the image forming apparatus 200 may be a monochromatic printer capable of forming only a monochromatic image, or may be a color printer capable of forming a multicolor image.

Figure 2:
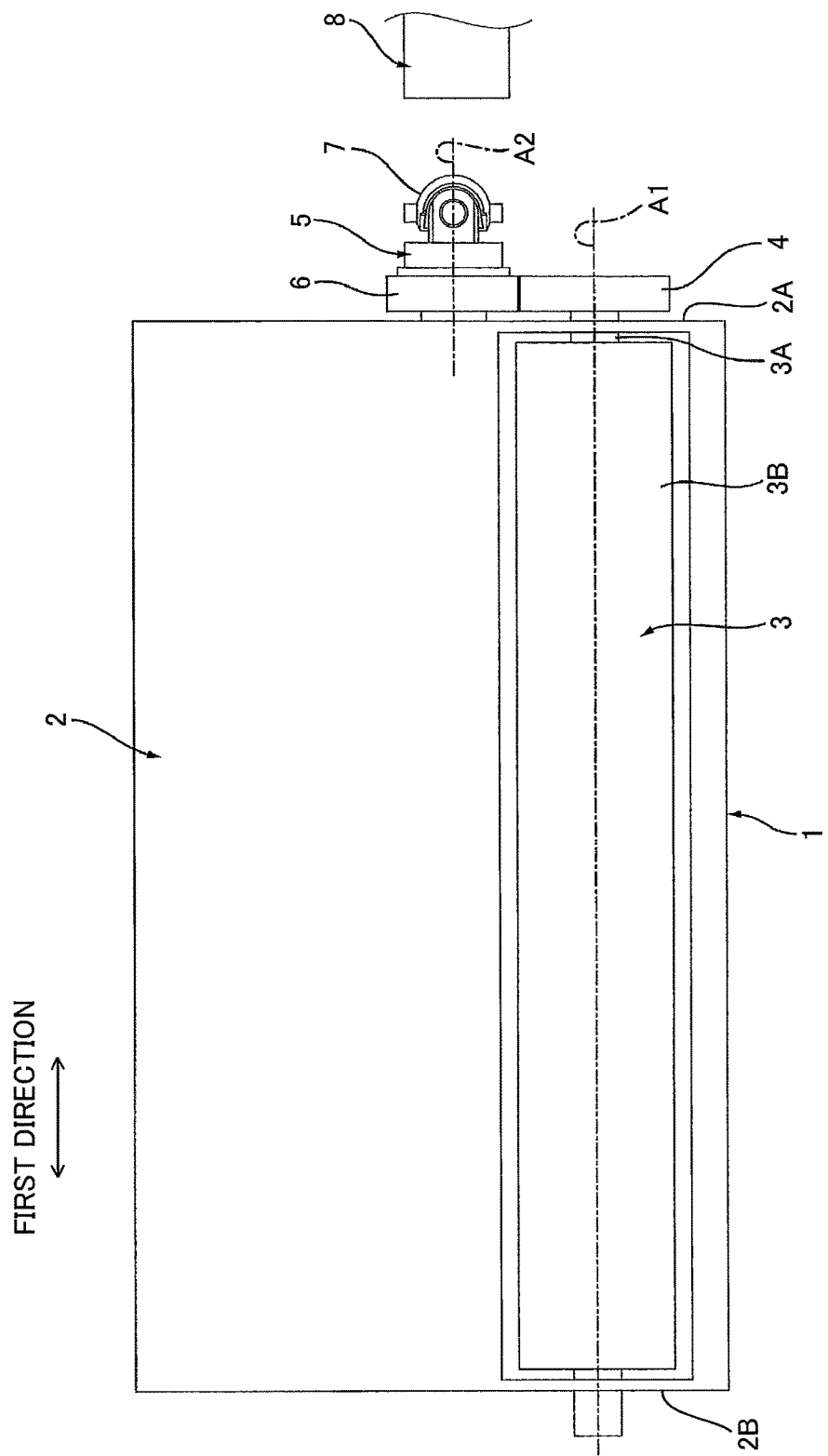
FIG. 2 is a schematic diagram of the developing cartridge according to the first embodiment.

As illustrated in FIG. 2, the image forming apparatus 200 further includes a main body coupling 8 (described later in detail) for inputting driving force to the developing cartridge 1.

Next, overall of the developing cartridge 1 will be described.

The developing cartridge 1 includes a casing 2, a developing roller 3, a developing roller gear 4, and a developing coupling 5. The developing roller 3 is rotatable about a first axis A1 extending in a first direction.

<1.1 Casing 2>

The casing 2 extends in the first direction and configure to accommodate developing agent (for example, toner) therein. In the following description, the phrase "inside the casing 2" denotes an interior space of the casing 2 in which the developing agent is accommodated, and the phrase "outside the casing 2" denotes a space other than the interior space of the casing 2. The casing 2 has an outer surface 2A and an outer surface 2B. The outer surface 2A and the outer surface 2B are spaced apart from each other in the first direction.

<1.2 Developing Roller 3>

The developing roller 3 is positioned at one end portion of the casing 2. A portion of an outer circumferential surface of the developing roller 3 is exposed to the outside the casing 2. The developing roller 3 includes a developing roller shaft 3A and a developing roller body 3B. The developing roller shaft 3A extends along the first axis A1. The developing roller shaft 3A has one end portion in the first direction extending through the outer surface 2A. The developing roller body 3B extends in the first direction. The developing roller body 3B has a hollow cylindrical shape so as to cover the developing roller shaft 3A. The developing roller body 3B is rotatable together with the developing roller shaft 3A.

Incidentally, the developing roller shaft 3A may extend through the developing roller body 3B in the first direction. Alternatively, the developing roller shaft 3A may not extend through the developing roller body 3B in the first direction. For example, the developing roller shaft 3A may include a shaft extending from one end portion of the developing roller body 3B in the first direction and a shaft extending from another end portion of the developing roller body 3B in the first direction.

<1.3 Developing Roller Gear 4>

The developing roller gear 4 is positioned outside the casing 2 in the first direction. More specifically, the developing roller gear 4 is positioned at the outer surface 2A of the casing 2. The developing roller gear 4 is positioned at one end portion of the developing roller 3 in the first direction. More specifically, the developing roller gear 4 is coupled to the one end portion of the developing roller shaft 3A in the first direction. Accordingly, the developing roller gear 4 is rotatable together with the developing roller shaft 3A. The developing roller gear 4 includes a plurality of gear teeth positioned at a circumferential surface of the developing roller gear 4 and arrayed in a rotational direction thereof.

<1.4 Developing Coupling 5>

The developing coupling 5 is positioned outside the casing 2 in the first direction. Specifically, the developing coupling 5 is positioned at the outer surface 2A. The developing coupling 5 is rotatable about a second axis A2 extending in the first direction. The developing coupling 5 includes a coupling gear 6 and a joint 7.

The coupling gear 6 is rotatable about the second axis A2. The coupling gear 6 is positioned between the casing 2 and the joint 7 in the first direction. The coupling gear 6 includes a plurality of gear teeth positioned at a circumferential surface of the coupling gear 6 and arrayed in a rotational direction thereof. The coupling gear 6 meshingly engages with the developing roller gear 4. More specifically, at least one tooth of the plurality of gear teeth of the coupling gear 6 meshingly engages with at least one gear tooth of the plurality of gear teeth of the developing roller gear 4.

The joint 7 is configured to receive driving force from the image forming apparatus 200. The joint 7 is positioned opposite to the casing 2 with respect to the coupling gear 6 in the first direction. In other words, the joint 7 is positioned opposite to the developing roller 3 with respect to the coupling gear 6 in the first direction. The joint 7 is rotatable together with the coupling gear 6.

As described later in detail, the joint 7 is connectable to the main body coupling 8 of the image forming apparatus 200. As a result of connection to the main body coupling 8, the joint 7 can receive driving force from the main body coupling 8. Upon receiving driving force from the main body coupling 8, the joint 7 is rotatable together with the main body coupling 8.

<2. Details of Developing Coupling 5>

The detailed description as to the developing coupling 5 will be made with reference to FIGS. 3 through 6.

Figure 3:
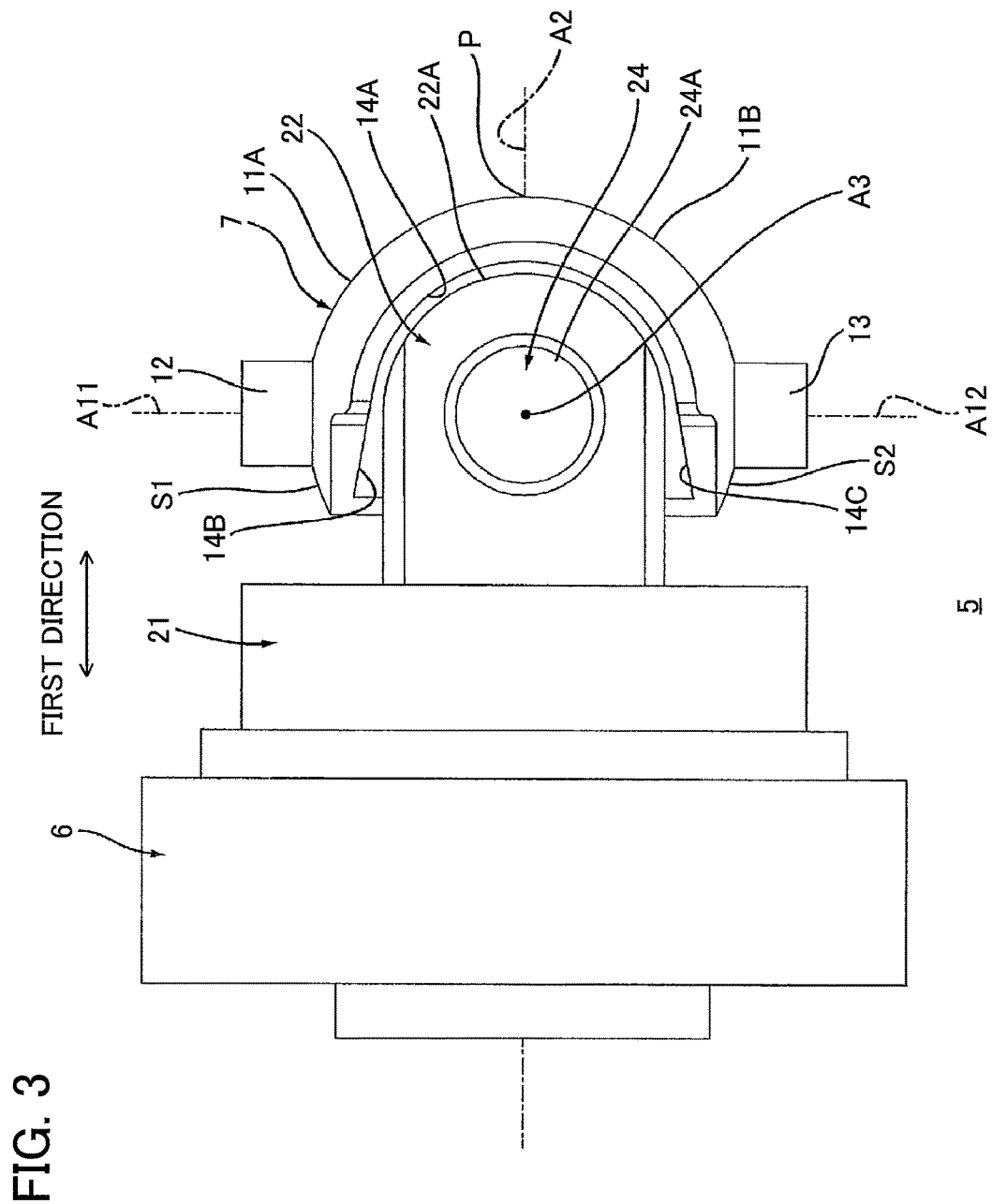
FIG. 3 is a side view of a developing coupling of the developing cartridge according to the embodiment as viewed in a second direction.
Figure 4:
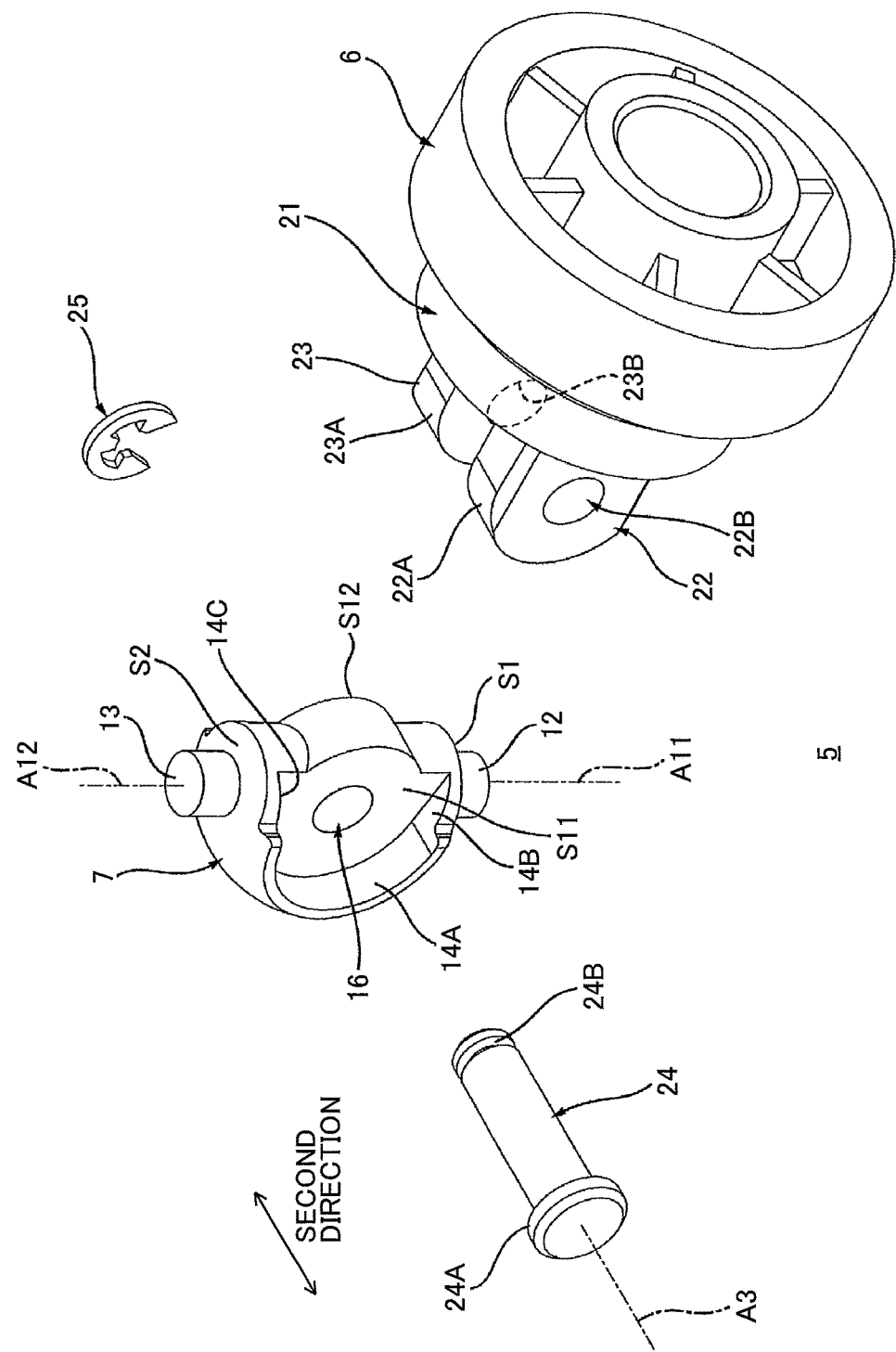
FIG. 4 is an exploded perspective view of the developing coupling.

As illustrated in FIGS. 3 and 4, the developing coupling 5 further includes a first bearing 22, a second bearing 23, and a shaft 24 in addition to the coupling gear 6 and the joint 7 indicated above. The joint 7 is pivotally movable relative to the coupling gear 6 about the shaft 24 by way of the first bearing 22, the second bearing 23, and the shaft 24. In other words, the joint 7 is pivotally movable relative to the coupling gear 6 about a third axis A3 along which the shaft 24 extends. The direction in which the shaft 24 extends will be referred to as "second direction". Details of the joint 7, the first bearing 22, the second bearing 23, and the shaft 24 will next be described.

<2.1 First Bearing 22 and Second Bearing 23>

The first bearing 22 receives one end portion of the shaft 24 (described later) in the second direction. The second bearing 23 receives another end portion of the shaft 24 in the second direction. The first bearing 22 and the second bearing 23 oppose each other in the second direction, and the second bearing 23 is positioned away from the first bearing 22 in the second direction. As will be described later in detail, the joint 7 has a portion positioned between the first bearing 22 and the second bearing 23 in the second direction.

The first bearing 22 and the second bearing 23 are rotatable together with the coupling gear 6. The first bearing 22 and the second bearing 23 are positioned opposite to the developing roller 3 (see FIG. 2) with respect to the coupling gear 6 in the first direction. In other words, the first bearing 22 and the second bearing 23 are positioned opposite to the outer surface 2A (see FIG. 2) with respect to the coupling gear 6 in the first direction.

The first bearing 22 has a hole 22B extending in the second direction. In the first embodiment, the hole 22B penetrates the first bearing 22 in the second direction. The shaft 24 is inserted through the hole 22B so that the first bearing 22 receives the one end portion of the shaft 24 in the second direction.

The second bearing 23 has a hole 23B extending in the second direction. In the first embodiment, the hole 23B penetrates the second bearing 23 in the second direction. The shaft 24 is inserted through the hole 23B so that the second bearing 23 receives the other end portion of the shaft 24 in the second direction. Further, at least a portion of the hole 22B is aligned with at least a portion of the hole 23B in the second direction. Note that, while both the hole 22B and the hole 23B are through-holes in the first embodiment, only one of the hole 22B and the hole 23B may be a through-hole.

<2.2 Cylindrical Portion 21>

The developing coupling 5 further includes a cylindrical portion 21. The cylindrical portion 21 is positioned between the coupling gear 6 and the first bearing 22 in the first direction. The cylindrical portion 21 is also positioned between the coupling gear 6 and the second bearing 23 in the first direction. The cylindrical portion 21 extends from one end face of the coupling gear 6 in the first direction. The first bearing 22 and the second bearing 23 extends from the cylindrical portion 21 in the first direction. The cylindrical portion 21 has a solid cylindrical shape extending in the first direction. The cylindrical portion 21 has an outer diameter smaller than an outer diameter of the coupling gear 6 defined by an addendum circle of the coupling gear 6.

<2.3 Details of Joint 7>

As described above, the joint 7 has the portion positioned between the first bearing 22 and the second bearing 23 in the second direction. The joint 7 has a through-hole 16 extending in the second direction to penetrate the joint 7 in the second direction and to allow the shaft 24 to extend therethrough.

At least a portion of the through-hole 16 is aligned with at least a portion of the hole 22B in the second direction in a state where the portion of the joint 7 is positioned between the first bearing 22 and the second bearing 23 in the second direction. Further, at least a portion of the through-hole 16 is aligned with at least a portion of the hole 23B in the second direction in a state where the portion of the joint 7 is positioned between the first bearing 22 and the second bearing 23 in the second direction. As a result, the shaft 24 is inserted through the hole 22B, the through-hole 16, and the hole 23B.

The joint 7 has an outer surface S11 and an outer surface S12. The outer surface S11 is an outer surface of one end of the joint 7 in the second direction, while the outer surface S12 is an outer surface of another end of the joint 7 in the second direction. The outer surface S12 is spaced apart from the outer surface S11 in the second direction. In a state where the portion of the joint 7 is interposed between the first bearing 22 and the second bearing 23 in the second direction, the outer surfaces S11 faces the first bearing 22, and the outer surface S12 faces the first bearing 22.

Figure 5:
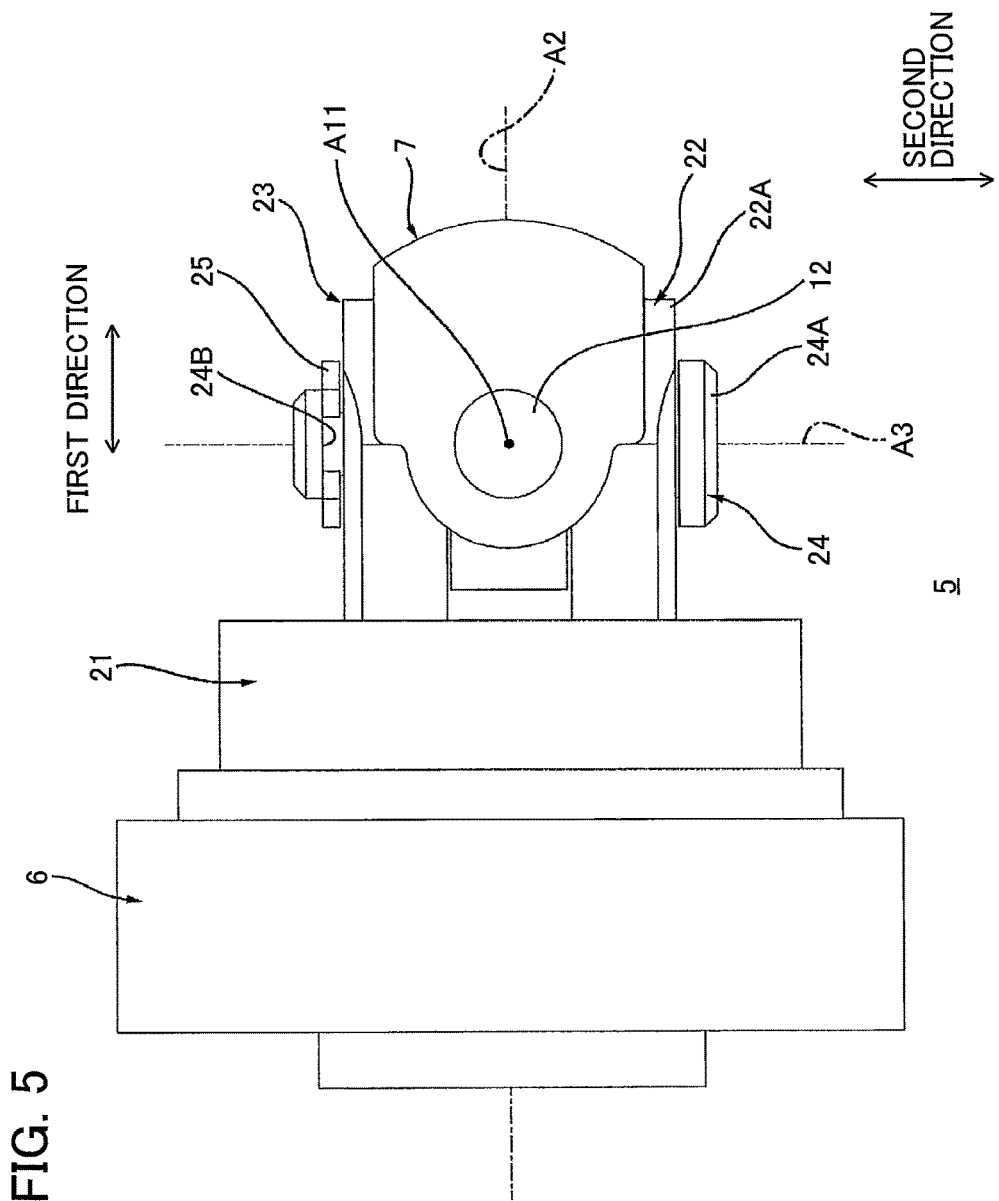
FIG. 5 is a side view of the developing coupling as viewed in a third direction.

As illustrated in FIGS. 4 and 5, the shaft 24 extends in the second direction. The one end portion of the shaft 24 in the second direction includes a head 24A, and the other end portion of the shaft 24 in the second direction has a groove 24B. The head 24A has an outer diameter greater than an outer diameter of a body of the shaft 24 and an inner diameter of the hole 22B as viewed in the second direction. With this configuration, the head 24A faces the first bearing 22 in a state where the shaft 24 is inserted through the hole 22B, the through-hole 16, and the hole 23B. The groove 24B is recessed radially inward from an outer peripheral surface of the shaft 24, and extends in a circumferential direction of the shaft 24. The groove 24B is positioned opposite to the head 24A with respect to the first bearing 22 and the second bearing 23 in a state where the shaft 24 is inserted through the hole 22B, the through-hole 16, and the hole 23B.

The joint 7 further includes a stopper 25. The stopper 25 is fitted with the groove 24B in a state where the shaft 24 is inserted through the hole 22B, the through-hole 16, and the hole 23B. The stopper 25 faces the second bearing 23 in the second direction in a state where the shaft 24 is inserted through the hole 22B, the through-hole 16, and the hole 23B and in a state where the stopper 25 is fitted with the groove 24B. Accordingly, the stopper 25 prevents the shaft 24 from being unintentionally extracted from the hole 22B, the through-hole 16, and the hole 23B.

The joint 7 is spaced apart from the cylindrical portion 21 in a state where the shaft 24 is inserted through the hole 22B, the through-hole 16, and the hole 23B and in a state where the stopper 25 is fitted with the groove 24B. Hence, the joint 7 is pivotally movable about the shaft 24 relative to the first bearing 22 and the second bearing 23 between a first position illustrated in FIG. 6A and a second position illustrated in FIG. 6B.

As illustrated in FIGS. 6A and 6B, the first bearing 22 has a tip end portion having an arcuate surface 22A. Similarly, the second bearing 23 has a tip end portion having an arcuate surface 23A. Further, the joint 7 has an arcuate surface 14A. The arcuate surface 14A extends along and spaced away from the arcuate surface 22A of the first bearing 22 in a state where the portion of the joint 7 is positioned between the first bearing 22 and the second bearing 23 in the second direction and in a state where the shaft 24 is inserted through the hole 22B, the through-hole 16, and the hole 23B. With this configuration, the joint 7 is pivotally movable about the shaft 24 between the first position and the second position while preventing contact of the arcuate surface 14A with the first bearing 22.

The arcuate surface 14A includes one end portion 14B and another end portion 14C. The one end portion 14B contacts the first bearing 22 as a result of pivotal movement of the joint 7 from the second position illustrated in FIG. 6B to the first position illustrated in FIG. 6A. Thus, the one end portion 14B can retain the joint 7 at the first position and prevent further pivotal movement of the joint 7. Further, the other end portion 14C contacts the first bearing 22 as a result of pivotal movement of the joint 7 from the first position illustrated in FIG. 6A to the second position illustrated in FIG. 6B. Thus, the other end portion 14C can retain the joint 7 at the second position and prevent further pivotal movement of the joint 7.

When the joint 7 pivotally moves between the first position and the second position in a state where the portion of the joint 7 is positioned between the first bearing 22 and the second bearing 23 in the second direction and in a state where the shaft 24 is inserted through the hole 22B, the through-hole 16, and the hole 23B, the joint 7 does not contact the cylindrical portion 21. Incidentally, the cylindrical portion 21 can be used as a member for preventing unintentional pivotal movement of the joint 7.

Similarly, the joint 7 further has an arcuate surface (not illustrated) aligned with the arcuate surface 14A in the second direction. The arcuate surface (not illustrated) has a shape the same as the shape of the arcuate surface 14A. The arcuate surface (not illustrated) extends along and spaced away from the arcuate surface 23A of the second bearing 23 in a state where the portion of the joint 7 is positioned between the first bearing 22 and the second bearing 23 in the second direction and in a state where the shaft 24 is inserted through the hole 22B, the through-hole 16, and the hole 23B.

Next, configuration of the joint 7 for being connected to the main body coupling 8 will be described with reference to FIGS. 3 and 4. The joint 7 includes a first protrusion 12 and a second protrusion 13.

The first protrusion 12 extends in a diametrical direction of the coupling gear 6. Hereinafter, the direction in which the first protrusion 12 extends will be referred to as "first radial direction". The second protrusion 13 also extends in the diametrical direction of the coupling gear 6. Hereinafter, the direction in which the second protrusion 13 extends will be referred to as "second radial direction". In the first embodiment, the second radial direction is opposite to the first radial direction.

The second protrusion 13 is positioned away from and aligned with the first protrusion 12 in the diametrical direction of the coupling gear 6. Specifically, the first protrusion 12 extends from the joint 7 in the first radial direction. That is, the first protrusion 12 is positioned at a first outer surface S1, and extends from the first outer surface S1. The second protrusion 13 extends from the joint 7 in the second radial direction. That is, the first protrusion 12 is positioned at a second outer surface S2, and extends from the second outer surface S2. Each of the first protrusion 12 and the second protrusion 13 has a solid cylindrical shape. The first protrusion 12 has a center axis A11 extending in the first radial direction, and the second protrusion 13 has a center axis A12 extending in the second radial direction. Preferably, the center axis A12 of the second protrusion 13 is coincident with the center axis A11.

Each of the first radial direction and the second radial direction crosses the second direction. More specifically, each of the first radial direction and the second radial direction crosses the second direction and the first direction.

Preferably, each of the first radial direction and the second radial direction is perpendicular to the second direction. More specifically, each of the first radial direction and the second radial direction is perpendicular to the second direction and the first direction.

When the developing coupling 5 is connected to the main body coupling 8, the first protrusion 12 and the second protrusion 13 are engageable with the main body coupling 8. Further, the first protrusion 12 and the second protrusion 13 are rotatable upon rotation of the developing coupling 5. Accordingly, the developing coupling 5 is rotatable in accordance with rotation of the main body coupling 8.

The joint 7 further has a third outer surface 11A and a fourth outer surface 11B. The third outer surface 11A is positioned between the first protrusion 12 and the second protrusion 13 in the diametrical direction of the coupling gear 6. The third outer surface 11A extends from a distal end P in the first direction of the joint 7 toward the first protrusion 12. The distal end P is a farthest point of the joint 7 from the coupling gear 6 in the first direction. The distal end P is positioned opposite to the developing roller 3 (see FIG. 2) with respect to the coupling gear 6 in the first direction. The distal end P is positioned away from the first protrusion 12 in the first direction. Further, the third outer surface 11A has a shape spreading radially outward in a radial direction of the through-hole 16.

The fourth outer surface 11B is positioned between the first protrusion 12 and the second protrusion 13 in the diametrical direction of the coupling gear 6. The fourth outer surface 11B extends from the distal end P toward the second protrusion 13. Specifically, the fourth outer surface 11B has a shape spreading radially outward in the radial direction of the through-hole 16. That is, the third outer surface 11A is curved from the distal end P toward the first protrusion 12, and the fourth outer surface 11B is curved from the distal end P toward the second protrusion 13.

Figure 7:
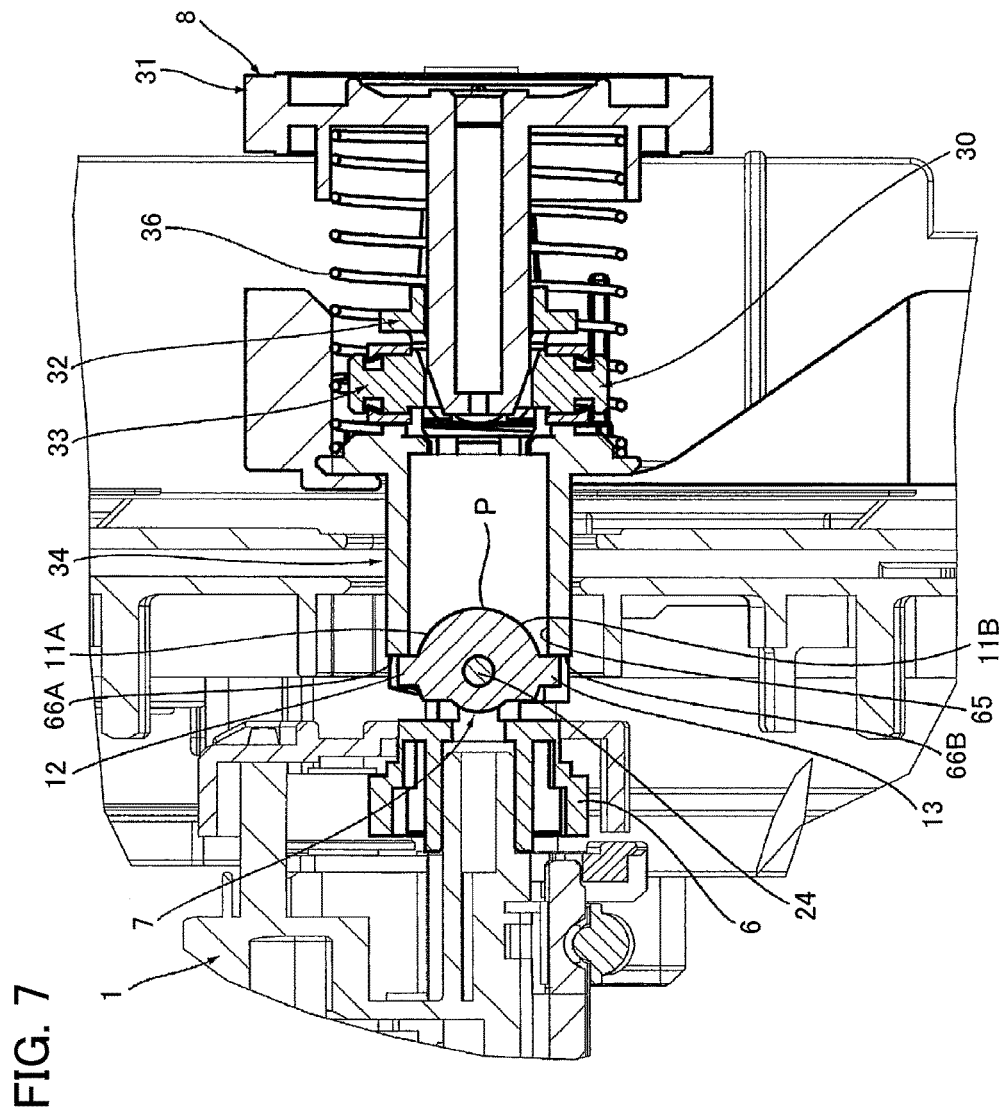
FIG. 7 is a view for description of connection between the developing coupling and a main body coupling of the image forming apparatus according to the embodiment.
Figure 8A:
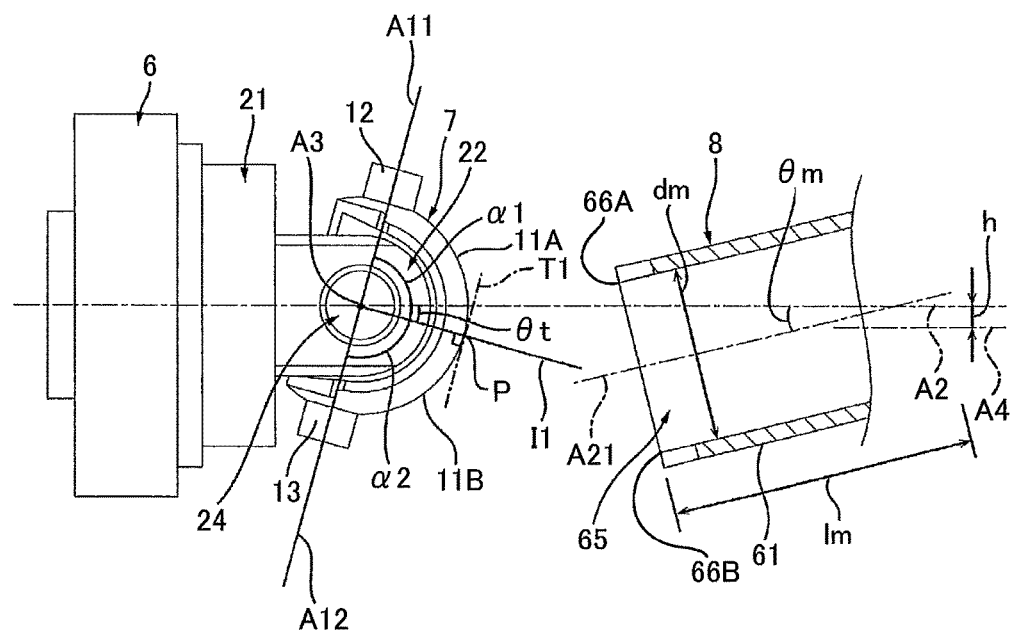
FIG. 8A is a view for description of a second joint of the main body coupling guided by the joint of the developing coupling, in which the joint has a spherical shape.

As illustrate in FIG. 7, the main body coupling 8 is connected to the developing coupling 5 along the curvatures of the third outer surface 11A and the fourth outer surface 11B. The main body coupling 8 may approach the developing coupling 5 while the main body coupling 8 is inclined relative to the developing coupling 5, as illustrated in FIG. 8A. In this case, the third outer surface 11A guides a second joint 34 (described later) of the main body coupling 8 toward the first protrusion 12. More specifically, the third outer surface 11A guides a first recess 66A (described later) of the main body coupling 8 toward the first protrusion 12.

Further, the fourth outer surface 11B guides the second joint 34 of the main body coupling 8 toward the second protrusion 13. More specifically, the fourth outer surface 11B guides a second recess 66B (described later) of the main body coupling 8 toward the second protrusion 13. This configuration enables inclination of the main body coupling 8 to be corrected even when the main body coupling 8 is inclined relative to the developing coupling 5. Then, the main body coupling 8 is connected to the joint 7 in a state where the inclination of the main body coupling 8 relative to the developing coupling 5 is corrected.

The third outer surface 11A of the joint 7 can guide the first recess 66A as long as the distal end P of the joint 7 is positioned between the first recess 66A and the second recess 66B.

Positions of the first recess 66A, the second recess 66B, and the distal end P are obtained by the following expressions (1), (2), and (3), respectively.

$$lm \times \sin\theta m - dm/2 \times \cos\theta m \quad (1)$$

$$lm \times \sin\theta m + dm/2 \times \cos\theta m \quad (2)$$

$$h + dt/2 \times 1/\cos(90° - \alpha) \times \sin\theta t \quad (3)$$

The distal end P of the joint 7 is positioned between the first recess 66A and the second recess 66B provided that the value obtained by the expression (3) is greater than the value obtained by the expression (1) and smaller than the value obtained by the expression (2).

Further, the distal end P does not interfere an inner surface of the second joint 34 provided that the following expression (4) is satisfied when the third outer surface 11A of the joint 7 guides the first recess 66A.

$$\alpha > \theta m + \Delta t \quad (4)$$

In the expressions (1) through (4), "lm" denotes a length from a pivot center of the second joint 34 to a distal end of the second joint 34. "dm" denotes an inner diameter of a hole 65 formed in the second joint 34. "θm" denotes an inclination angle of the second joint 34 relative to the second axis A2. Specifically, "θm" denotes an angle between a center axis A21 of the second joint 34 and the second axis A2. "dt" denotes a diameter of a circle centered on the third axis A3. In a case where each of the third outer surface 11A and the fourth outer surface 11B is a spherical surface, "dt" is equal to a diameter of the third outer surface 11A and the fourth outer surface 11B.

"θt" denotes an inclination angle of the joint 7 relative to the second axis A2. Specifically, "θt" is an angle between the second axis A2 and a straight line passing through the distal end P and the third axis A3. "α1" denotes an angle between the center axis A11 of the first protrusion 12 and an imaginary line "I1" (an example of a first imaginary line). The imaginary line "I1" passes through the third axis A3 and is perpendicular to a tangential line T1 tangent to the third outer surface 11A. Note that the angle "α1" and an angle "α2" (described later) will be collectively referred to as "α". "h" denotes a distance between the second axis A2 and a fourth axis A4 which is a rotational axis of a driving force transmission member 31 (described later) extending in the first direction.

For example, assuming that "lm" is 27.4 mm, "dm" is 12 mm, "θm" is 10°, "dt" is 10.8 mm, "θt" is 20°, "α" is 90°, and "h" is 1 mm, the value obtained by the expression (1) is −1.15 mm. Note that the third outer surface 11A of the joint 7 is a spherical surface when "α" is 90°. In this case, a tangential line tangent to the fourth outer surface 11B is coincident with the tangential line T1. Therefore, an imaginary line (an example of a second imaginary line) passing through the third axis A3 and perpendicular to the tangential line tangent to the fourth outer surface 11B is also coincident with the imaginary line "I1". The angle "α2" between the imaginary line passing through the third axis A3 and perpendicular to the tangential line tangent to the fourth outer surface 11B, and the center axis A12 of the second protrusion 13 is 90°, similar to the angle "α1". Therefore, the fourth outer surface 11B of the joint 7 is also a spherical surface.

Further, the value obtained by the expression (2) is 10.67 mm, and the value obtained by the expression (3) is 2.85 mm. Since the value obtained by the expression (3) is greater than the value obtained by the expression (1) and smaller than the value obtained by the expression (2), the distal end P of the joint 7 is positioned between the first recess 66A and the second recess 66B. Accordingly, the third outer surface 11A of the joint 7 can guide the first recess 66A.

Further, "θm"+"θt" is 30°, which is smaller than the angle "α1". Thus, the expression (4) can be satisfied. Consequently, interference of the distal end P with the inner surface of the second joint 34 does not occur during guiding of the first recess 66A by the third outer surface 11A of the joint 7.

Figure 8B:
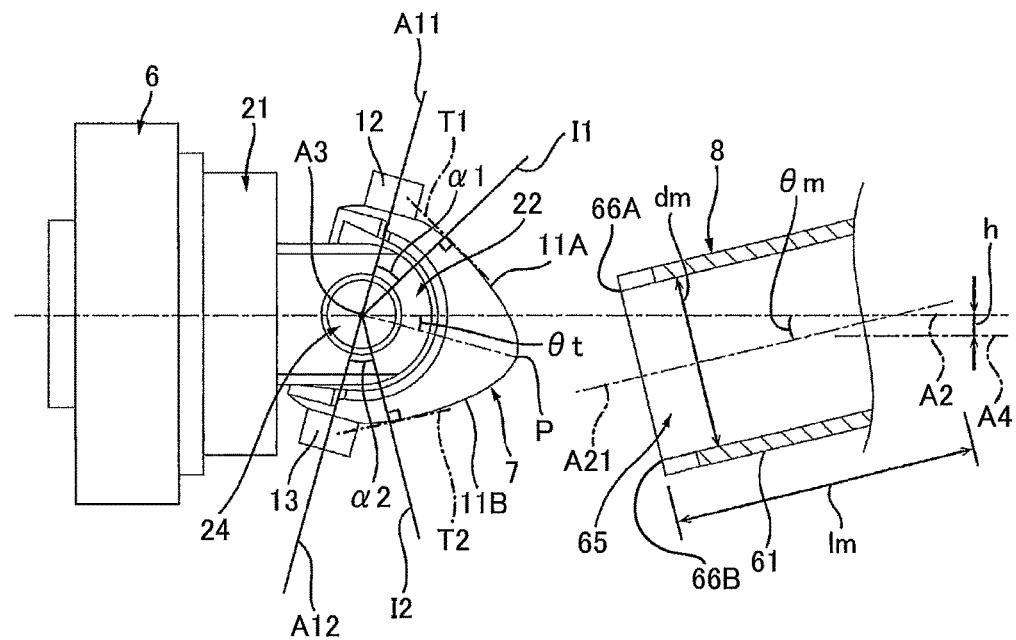
FIG. 8B is a view for description of the second joint of the main body coupling guided by the joint of the developing coupling, in which the joint has a conical shape.

The same is true with respect to modifications illustrated in FIG. 8B and modifications illustrated in FIGS. 17A through 17D whose joint 7 has a protruding distal end P.

Specifically, assuming that "lm" is 27.4 mm, "dm" is 12 mm, "θm" is 10°, "dt" is 10.8 mm, "θt" is 20°, "α1" is 45°, and "h" is 1 mm, the value obtained by the expression (1) is −1.15 mm. Note that the third outer surface 11A of the joint 7 is a conical surface illustrated in FIG. 8B when the angle "α1" is 45°. Here, the angle "α2" between the center axis A12 of the second protrusion 13 and the imaginary line "I2" passing through the third axis A3 and perpendicular to a tangential line T2 tangent to the fourth outer surface 11B is equal to the angle "α1", i.e., 45°. Hence, the fourth outer surface 11B of the joint 7 is also a conical surface.

Further, the value obtained by the expression (2) is 10.67 mm, and the value obtained by the expression (3) is 3.61 mm. Since the value obtained by the expression (3) is greater than the value obtained by the expression (1) and smaller than the value obtained by the expression (2), the distal end P of the joint 7 is positioned between the first recess 66A and the second recess 66B. Accordingly, the third outer surface 11A of the joint 7 can guide the first recess 66A.

Further, "θm"+"θt" is 30°, which is smaller than the angle "α1". Thus, the expression (4) can be satisfied. Consequently, distal end P does not interfere with the inner surface of the second joint 34 during guiding of the first recess 66A by the third outer surface 11A of the joint 7.

Incidentally, each parameter "θt", "θm", and "h" has a tolerable maximum value. The third outer surface 11A of the joint 7 can guide the first recess 66A as long as the conditions represented in the expressions (1), (2), and (3) are satisfied provided that each parameter "θt", "θm", and "h" is its tolerable maximum value.

Further, since the joint 7 is pivotally movable relative to the coupling gear 6, the developing coupling 5 and the main body coupling 8 constitute in combination a universal joint as a result of connection of the developing coupling 5 to the main body coupling 8 as illustrated in FIG. 7. More specifically, the universal joint provided as a result of the connection between the developing coupling 5 and the main body coupling 8 is a Cardan joint.

Next, details of the main body coupling 8 will be described with reference to FIGS. 9 and 10.

<3. Main Body Coupling 8>

The developing coupling 5 described above is configured to be connected to the main body coupling 8. As illustrated in FIG. 9, the main body coupling 8 includes the driving force transmission member 31 and a universal joint 30.

The driving force transmission member 31 is rotatable about the fourth axis A4 extending in the first direction upon receipt of driving force from a motor of the image forming apparatus 200. The driving force transmission member 31 includes a gear portion 41 and a shaft 42.

The gear portion 41 includes a plurality of gear teeth positioned at a peripheral surface of the gear portion 41 and arrayed in a rotational direction of the driving force transmission member 31. The gear portion 41 rotates upon receipt of driving force from the motor of the image forming apparatus 200. The shaft 42 extends in the first direction, and is attached to the universal joint 30 (described later). With this configuration, the universal joint 30 is rotatable together with the driving force transmission member 31. That is, the driving force transmission member 31 supplies driving force for rotating the universal joint 30.

Figure 10:
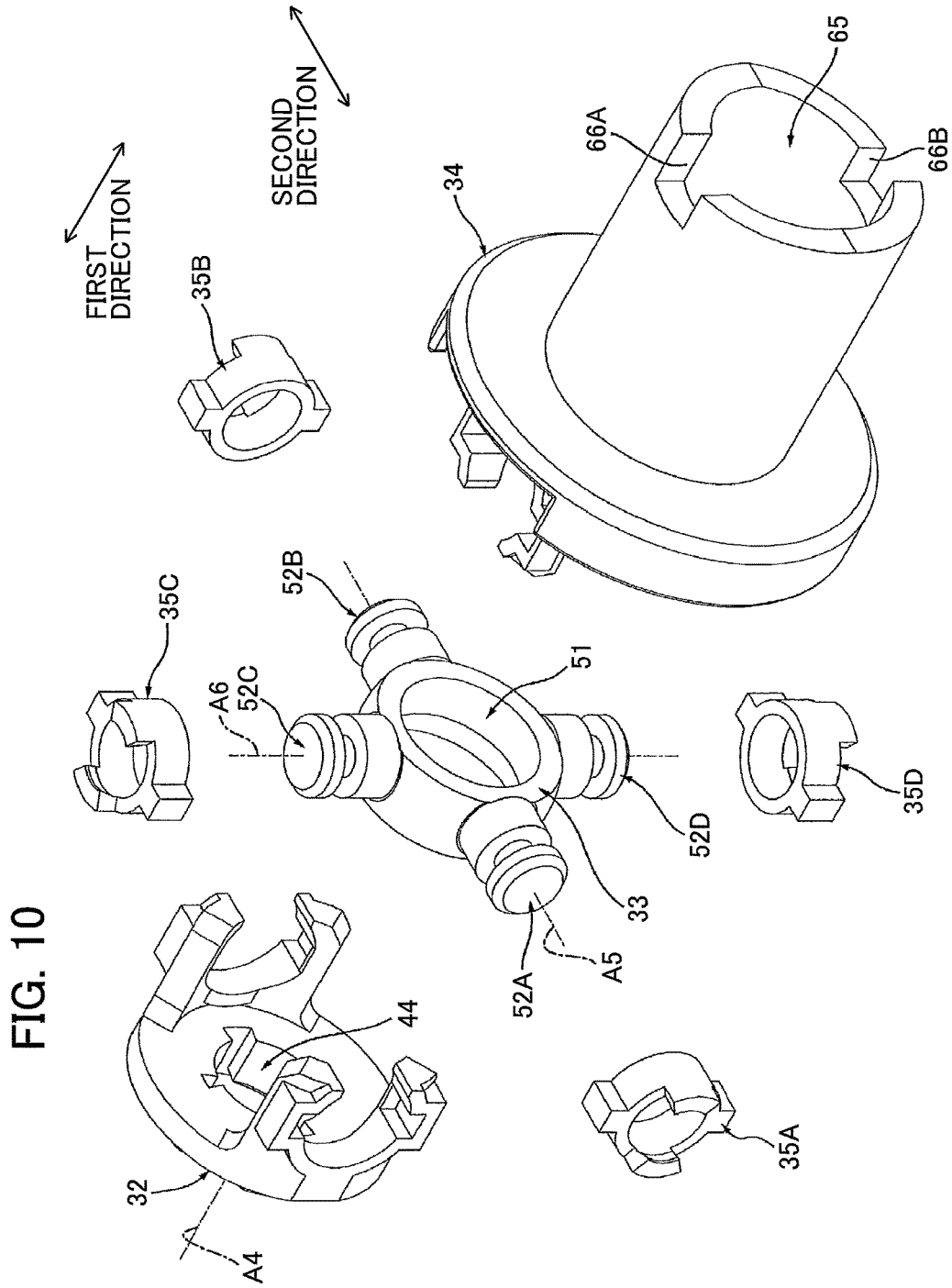
FIG. 10 is an exploded perspective view of a universal joint of the main body coupling, in which a spring of the universal joint is omitted.

As illustrated in FIG. 10, the universal joint 30 includes a first joint 32, a second joint 33, the second joint 34, four bearings 35A, 35B, 35C, and 35D, and a spring 36. The universal joint 30 is a Cardan joint.

The first joint 32 has a through-hole 44 that penetrates the first joint 32 in the first direction. The shaft 42 of the driving force transmission member 31 is inserted through the through-hole 44. Accordingly, the first joint 32 is rotatable together with the driving force transmission member 31.

The second joint 33 has a through-hole 51 that penetrates the second joint 33 in the first direction. The shaft 42 is also inserted through the through-hole 51. The second joint 33 includes four shafts 52A, 52B, 52C, and 52D.

The shaft 52A extends in a first radial direction of the through-hole 51. The shaft 52B extends in a second radial direction of the through-hole 51 that is opposite to the first radial direction. The shaft 52C extends in a third radial direction of the through-hole 51. The shaft 52D extends in a fourth radial direction of the through-hole 51 that is opposite to the third radial direction. The third radial direction crosses the first radial direction. Preferably, the third radial direction is perpendicular to the first radial direction. Similarly, the fourth radial direction crosses the first radial direction. Preferably, the fourth radial direction is perpendicular to the first radial direction.

The bearing 35A is assembled to the shaft 52A, and the bearing 35B is assembled to the shaft 52B. The first joint 32 is connected to the second joint 33 through the bearings 35A and 35B. As a result, the second joint 33 is rotatable together with the first joint 32. Further, the first joint 32 is pivotally movable about the shafts 52A and 52B relative to the second joint 33. That is, the first joint 32 is pivotally movable about a fifth axis A5 that extends along the shafts 52A and 52B relative to the second joint 33. Note that the fifth axis A5 extends in the second direction. Further, the bearings 35C is assembled to the shaft 52C, and the bearing 35D is assembled to the shaft 52D.

The second joint 34 is connected to the second joint 33 through the bearings 35C and 35D.

Therefore, the second joint 34 is rotatable together with the second joint 33. That is, the universal joint 30 is rotatable upon rotation of the second joint 34. Further, the second joint 33 is pivotally movable about the shaft 52C and 52D relative to the second joint 34. More specifically, the second joint 33 is pivotally movable about a sixth axis A6 extending along the shafts 52C and 52C relative to the second joint 34. The sixth axis A6 extends in a third direction. The fifth axis A5 and the sixth axis A6 cross each other. Preferably, the fifth axis A5 and the sixth axis A6 are perpendicular to each other.

As described above, the first joint 32 is pivotally movable about the fifth axis A5 extending in the second direction relative to the second joint 33, and the second joint 33 is pivotally movable about the sixth axis A6 extending in the third direction relative to the second joint 34. Accordingly, the universal joint 30 can function as an eccentric coupling.

The second joint 34 has the first recess 66A and the second recess 66B. The first protrusion 12 of the joint 7 can be fitted into the first recess 66A, and the second protrusion 13 of the joint 7 can be fitted into the second recess 66B. As a result, the second joint 34 is connected to the joint 7, and thus the joint 7 is rotatable together with the second joint 34.

Further, the second joint 34 has the hole 65. The hole 65 is formed at a position between the first recess 66A and the second recess 66B. The hole 65 is recessed from a tip end of the second joint 34 toward the second joint 33. As illustrated in FIG. 7, the hole 65 receives the third outer surface 11A and the fourth outer surface 11B of the joint 7 when the first protrusion 12 and the second protrusion 13 are fitted into the first recess 66A and the second recess 66B, respectively.

Figure 9:
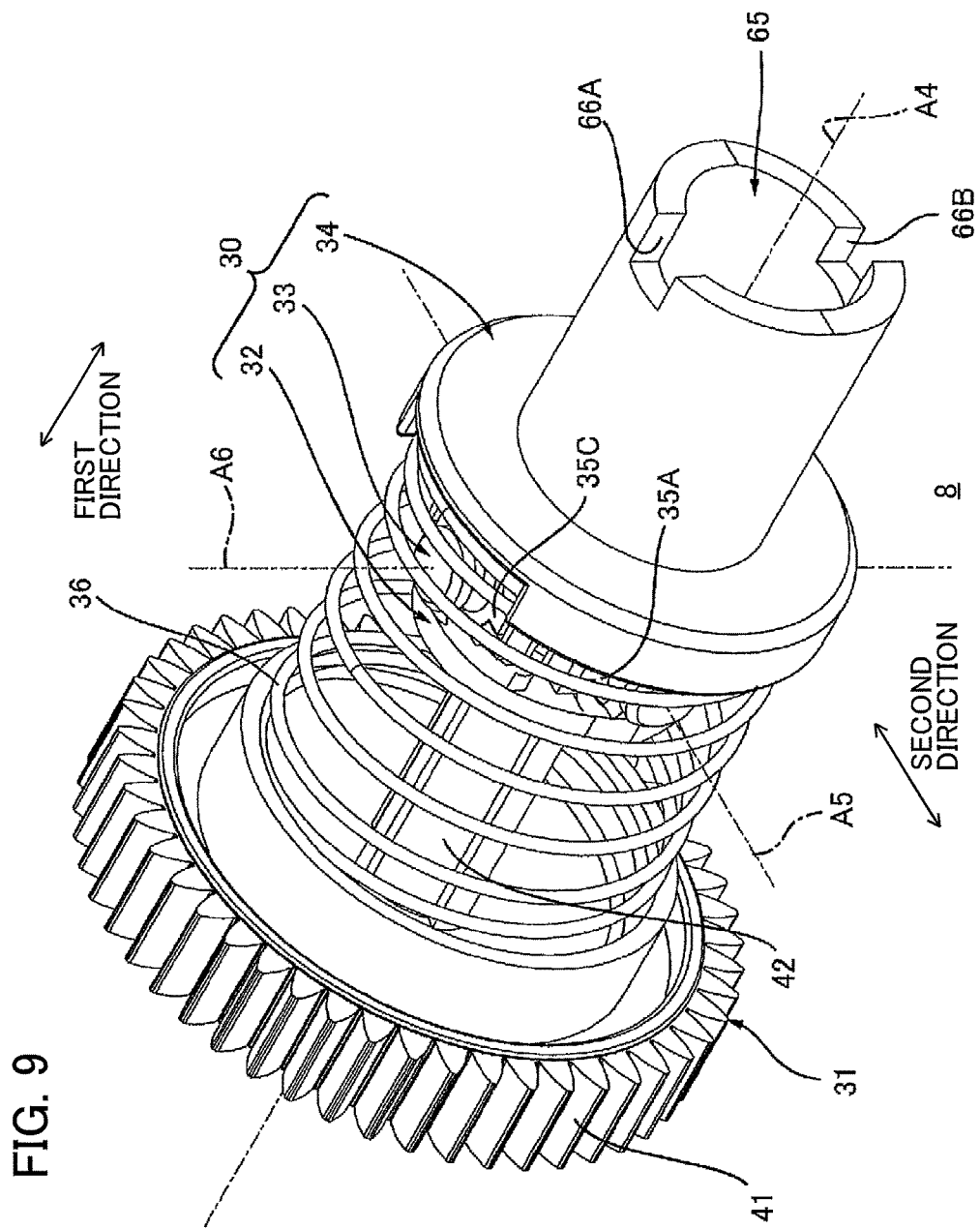
FIG. 9 is a perspective view of the main body coupling.

As illustrated in FIG. 9, the spring 36 is interposed between the second joint 34 and the driving force transmission member 31 in the first direction. The spring 36 has one end portion fixed to the second joint 34, and another end portion fixed to the driving force transmission member 31. Accordingly, the spring 36 can absorb impact force due to the connection between the second joint 34 and the joint 7.

When the first protrusion 12 and the second protrusion 13 are fitted into the first recess 66A and second recess 66B, respectively, a second universal joint is constituted by the joint 7 and the second joint 34, in addition to the universal joint 30. That is, the joint 7 and the second joint 34 function as an eccentric coupling. Since the developing coupling 5 can receive the driving force from the motor of the image forming apparatus 200 through two eccentric couplings (i.e., the universal joint 30, and the universal joint constituted of the joint 7 and the second joint 34), the developing coupling 5 can be stably driven. Consequently, the coupling gear 6 can be stably rotated by virtue of the two eccentric couplings even when the rotational axis of the driving force transmission member 31 (i.e., the fourth axis A4) is not coincident with the rotational axis of the coupling gear 6 (i.e., the second axis A2).

Further, in the first embodiment, the image forming apparatus 200 does not need to include all parts and components for constituting a single universal joint, since the developing coupling 5 of the developing cartridge 1 includes a part of components constituting the single universal joint. If the image forming apparatus 200 includes all parts and components for constituting the single universal joint, the universal joint may be suspended from the image forming apparatus 200. The developing coupling 5 includes the part of the components for constituting the single universal joint in the present embodiment, and this configuration can prevent suspension of the universal joint from the image forming apparatus 200.

Second Embodiment

Figure 11:
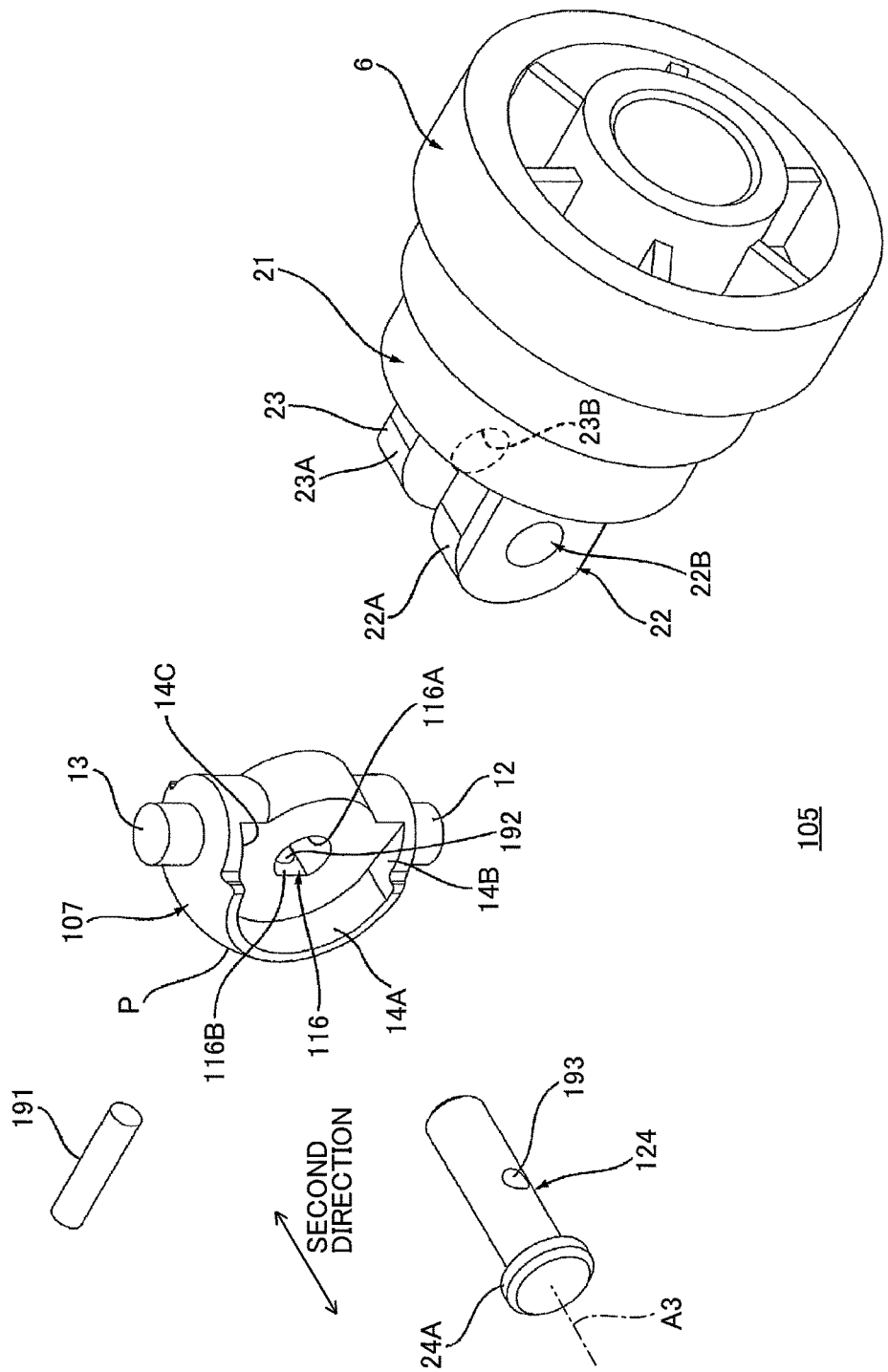
FIG. 11 is an exploded perspective view of a developing coupling of a developing cartridge according to a second embodiment.

A developing cartridge according to a second embodiment will next be described with reference to FIG. 11 wherein like parts and components are designated by the same reference numerals as those shown in the first embodiment.

In a developing coupling 105 according to the second embodiment, a joint 107 has a through-hole 116 having a D-shape. A part of an inner surface of the through-hole 116 is a flat surface 116B, and remaining part of the inner surface is a curved surface 116A. Further, the developing coupling 105 includes a shaft 124 whose cross-section is a D-shape in conformance with the shape of the through-hole 116. Accordingly, the joint 107 is pivotally movable about the third axis A3 together with the shaft 124 in a state where the shaft 124 is inserted through the hole 22B, the through-hole 116, and the hole 23B.

The joint 107 further has a through-hole 192 penetrating the joint 107 from the distal end P to the through-hole 116 in the first direction. Further, the shaft 124 has a through-hole 193 penetrating the shaft 124 in a radial direction of the through-hole 193. The through-hole 193 is aligned with the through-hole 192 in the radial direction of the shaft 124 as a result of insertion of the shaft 124 into the through-hole 116. The developing coupling 105 further includes a stopper 191 inserted through the through-hole 192 and the through-hole 193 in the radial direction of the shaft 124. Hence, the stopper 191 can prevent the shaft 124 from being unintentionally extracted from the through-hole 116.

Third Embodiment

Figure 12:
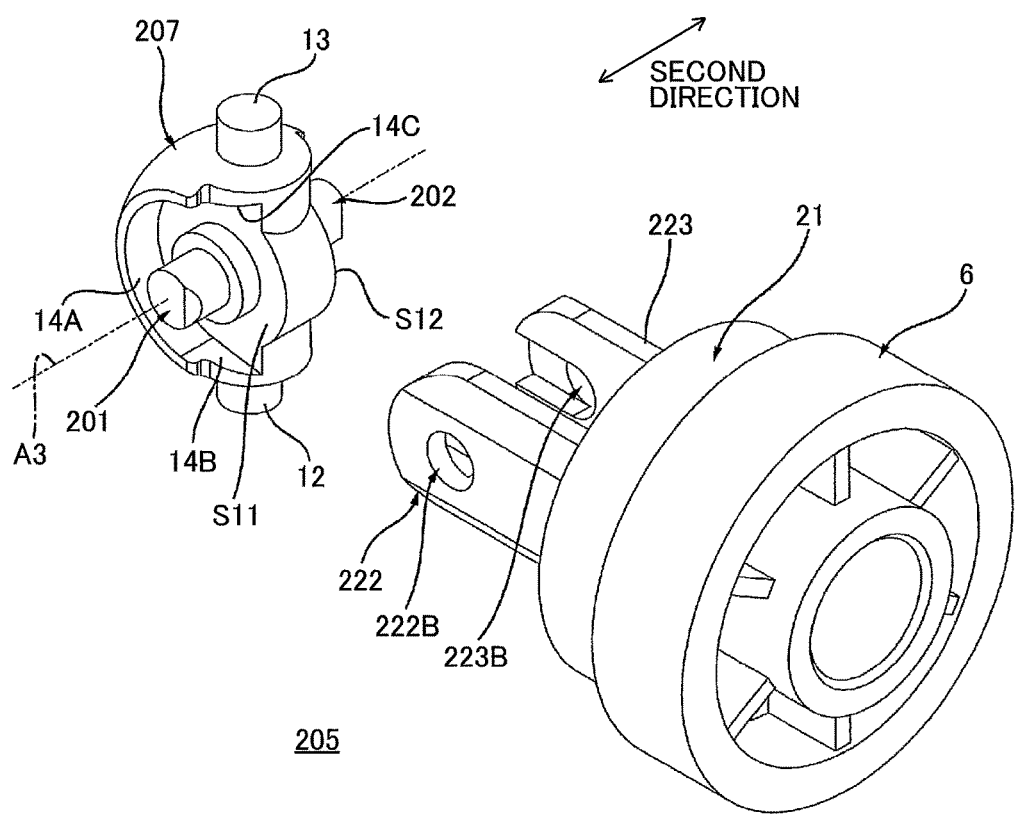
FIG. 12 is an exploded perspective view of a developing coupling of a developing cartridge according to a third embodiment.

A developing cartridge according to a third embodiment will next be described with reference to FIG. 12 wherein like parts and components are designated by the same reference numerals as those shown in the first embodiment.

A developing coupling 205 according to the third embodiment includes a joint 207, a first shaft 201 extending along the third axis A3, and a second shaft 202 extending along the third axis A3. The first shaft 201 and the second shaft 202 are integrally formed with the joint 207. Specifically, the first shaft 201 is positioned at the one outer surface S11 of the joint 207 in the second direction, and the second shaft 202 is positioned at the other outer surface S12 of the joint 207 in the second direction. More specifically, the first shaft 201 extends from the one outer surface S11 of the joint 207 in the second direction. The second shaft 202 extends from the other outer surface S12 of the joint 207 in a direction away from the first shaft 201 in the second direction. The second shaft 202 is positioned away from the first shaft 201 in the second direction. Each of the first shaft 201 and the second shaft 202 has a generally solid cylindrical shape.

The first shaft 201 is inserted into a through-hole 222B of a first bearing 222, and the second shaft 202 is inserted into a through-hole 223B of a second bearing 223. With this insertion, the first bearing 222 receives the first shaft 201, and the second bearing 223 receives the second shaft 202. Consequently, the joint 207 is pivotally movable about the first shaft 201 and the second shaft 202 relative to the coupling gear 6. That is, the joint 207 is pivotally movable about the third axis A3 relative to the coupling gear 6.

Fourth Embodiment

Figure 13:
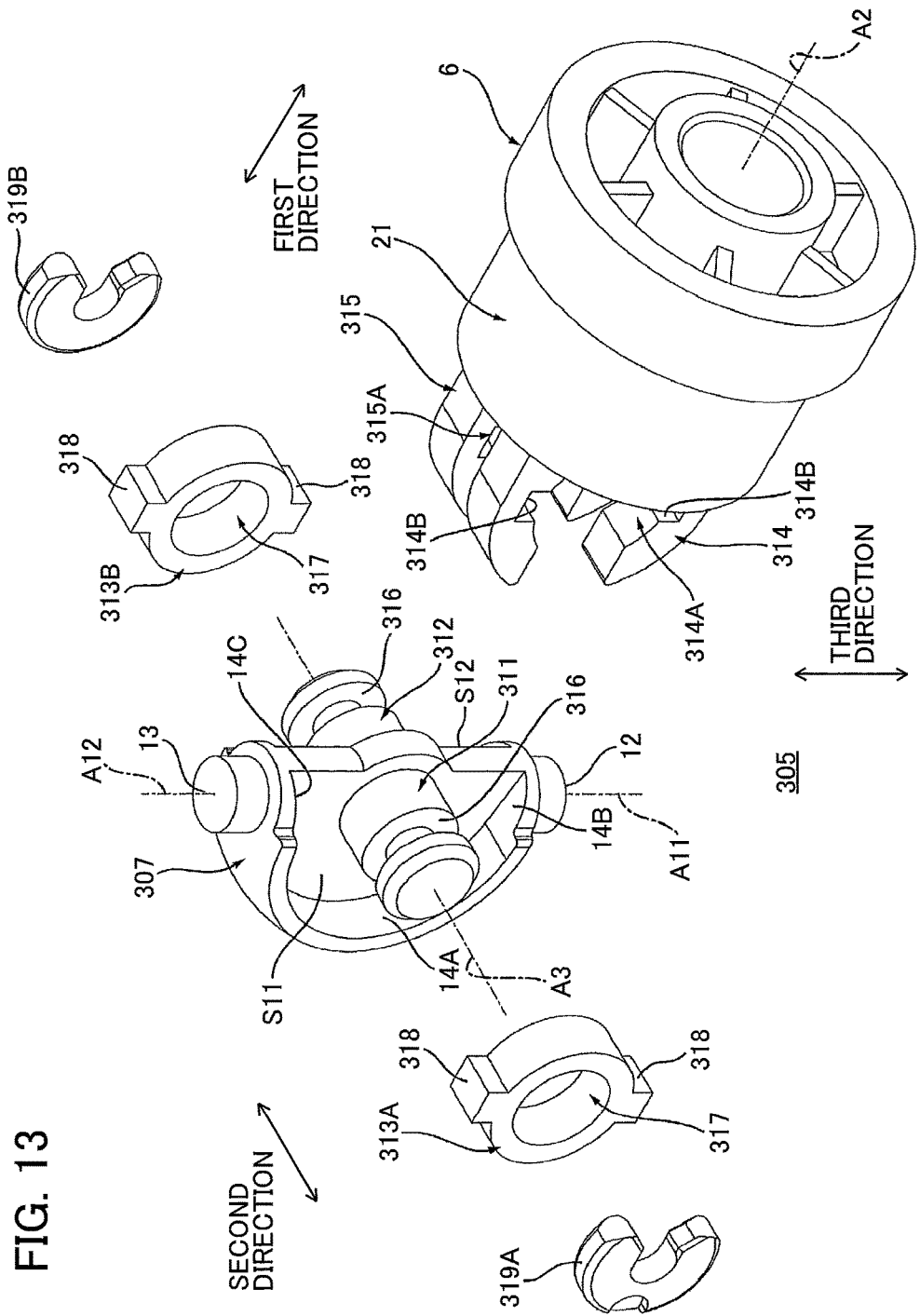
FIG. 13 is an exploded perspective view of a developing coupling of a developing cartridge according to a fourth embodiment.

A developing cartridge according to a fourth embodiment will next be described with reference to FIGS. 13 and 14 wherein like parts and components are designated by the same reference numerals as those shown in the first embodiment.

A developing coupling 305 according to the fourth embodiment includes a joint 307, a first shaft 311 extending along the third axis A3, and a second shaft 312 extending along the third axis A3, similar to the developing coupling 205 according to the third embodiment. The first shaft 311 and the second shaft 312 are integrally formed with the joint 307. Specifically, the first shaft 311 is positioned at the one outer surface S11 of the joint 307 in the second direction, and the second shaft 312 is positioned at the other outer surface S12 of the joint 307 in the second direction. More specifically, the first shaft 311 extends from the one outer surface S11 of the joint 307 in the second direction, and the second shaft 312 extends from the other outer surface S12 of the joint 307 in a direction away from the first shaft 311 in the second direction. The second shaft 312 is positioned away from the first shaft 311 in the second direction. Each of the first shaft 311 and the second shaft 312 has a generally solid cylindrical shape, and has a groove 316 recessed from a peripheral surface of each of the first shaft 311 and the second shaft 312.

The developing coupling 305 further includes a first support portion 314 and a second support portion 315. The first support portion 314 and the second support portion 315 extend in the first direction from the cylindrical portion 21. The first support portion 314 and the second support portion 315 are spaced away from each other in the second direction. A part of the joint 307 is interposed between the first support portion 314 and the second support portion 315 in the second direction.

The first support portion 314 has a through-hole 314A that penetrates the first support portion 314 in the second direction. Two grooves 314B are formed in an inner surface of the through-hole 314A. The two grooves 314B is recessed in directions opposite to each other in the third direction. That is, two grooves 314B are recessed from the inner surface of the through-hole 314A toward an outer surface of the first support portion 314. Each of the two grooves 314B extends in the second direction.

The second support portion 315 has a configuration the same as that of the first support portion 314. The second support portion 315 has a through-hole 315A having a shape the same as that of the through-hole 314A, and has two grooves (not illustrated) having the shapes identical to those of the grooves 314B.

A first bearing 313A is attached to the first support portion 314, and a second bearing 313B is attached to the second support portion 315. Specifically, the first bearing 313A is fitted with the through-hole 314A of the first support portion 314. The first bearing 313A includes two stoppers 318 protruding from a surface of the first bearing 313A in directions opposite to each other in the third direction. The two stoppers 318 are fitted with the corresponding two grooves 314B, respectively. Hence, rotation of the first bearing 313A relative to the first support portion 314 is prevented by the fitting engagement between the stoppers 318 and the grooves 314B.

Similarly, the second bearing 313B is fitted with the through-hole 315A, and two stoppers 318 protruding from the second bearing 313B are fitted with the corresponding grooves (not illustrated) of the second support portion 315, so that relative rotation between the second bearing 313B and the second support portion 315 is prevented.

As described above, the first bearing 313A is attached to the first support portion 314, and the second bearing 313B is attached to the second support portion 315. With this configuration, the first bearing 313A and the second bearing 313B are rotatable together with the coupling gear 6.

The first bearing 313A has a through-hole 317 penetrating the first bearing 313A in the second direction. Similarly, the second bearing 313B has a through-hole 317 penetrating the second bearing 313B in the second direction.

The first shaft 311 is inserted through the through-hole 317 of the first bearing 313A, and the second shaft 312 is inserted through the through-hole 317 of the second bearing 313B. That is, the first shaft 311 is supported by the first bearing 313A, and the second shaft 312 is supported by the second bearing 313B. The joint 307 is pivotally movable about the first shaft 311 and the second shaft 312 relative to the coupling gear 6.

The developing coupling 305 further includes a stopper 319A and a stopper 319B. The stopper 319A is fitted into the groove 316 of the first shaft 311, and faces the first bearing 313A in the second direction. Thus, the stopper 319A prevents the first bearing 313A from being removed from the first shaft 311. Similarly, the stopper 319B faces the second bearing 313B in the second direction to prevent the second bearing 313B from being removed from the second shaft 312.

Fifth Embodiment

A developing cartridge according to a fifth embodiment will next be described with reference to FIGS. 15 and 16, wherein like parts and components are designated by the same reference numerals as those shown in the first embodiment.

Similar to the developing coupling 205 according to the third embodiment, a developing coupling 405 according to the fifth embodiment includes a joint 407, a first shaft 421 extending along the third axis A3, and a second shaft 422 extending along the third axis A3. The first shaft 421 and the second shaft 422 are integrally formed with the joint 407. Specifically, the first shaft 421 is positioned at the one outer surface S11 of the joint 407 in the second direction, and the second shaft 422 is positioned at the other outer surface S12 of the joint 407 in the second direction. More specifically, the first shaft 421 extends from the one outer surface S11 of the joint 407 in the second direction, and the second shaft 422 extends from the other outer surface S12 of the joint 407 in a direction away from the first shaft 421 in the second direction. The second shaft 422 is positioned away from the first shaft 421 in the second direction. Each of the first shaft 421 and the second shaft 422 has a solid cylindrical shape.

The developing coupling 405 further includes a support portion 425 extending in the first direction from the cylindrical portion 21. The support portion 425 has one end portion and another end portion in the second direction. The one end portion is positioned away from the other end portion in the second direction. The support portion 425 has a recess 428, another recess (not illustrated), and a through-hole (not illustrated).

The recess 428 is formed at the one end portion of the support portion 425 in the second direction, and is recessed toward the other end portion of the support portion 425. The other recess (not illustrated) is positioned at the other end portion of the support portion 425 in the second direction, and is recessed toward the one end portion of the support portion 425. The through-hole (not illustrated) penetrates the support portion 425 in the second direction.

A first bearing 423 is attached to the recess 428. The first bearing 423 extends in the first direction, and has one end portion and another end portion in the first direction. The one end portion of the first bearing 423 is positioned farther from the coupling gear 6 than the other end portion of the first bearing 423 is from the coupling gear 6 in the first direction. The one end portion is positioned closer to the joint 407 than the other end portion is to the joint 407 in the first direction. The other end portion is fitted into the recess 428.

The first bearing 423 has a first through-hole 430 formed at the other end portion of the first bearing 423 in the first direction. The first through-hole 430 penetrates in the second direction the other end portion of the first bearing 423. The first through-hole 430 is aligned with the through-hole (not illustrated) of the support portion 425 in the second direction in a state where the other end portion of the first bearing 423 is fitted into the recess 428.

The second bearing 424 has a configuration the same as that of the first bearing 423. That is, the second bearing 424 has a first through-hole 430, and is attached to the recess (not illustrated) of the support portion 425. The first through-hole 430 of the second bearing 424 is aligned with the through-hole (not illustrated) of the support portion 425 in the second direction in a state where another end portion of the second bearing 424 is fitted into the recess 428.

The developing coupling 405 further includes an insertion member 426 extending in the second direction. The first bearing 423 and the second bearing 424 are assembled to the support portion 425 by inserting the insertion member 426 through the first through-hole 430 of the first bearing 423, the first through-hole 430 of the second bearing 424, and the through-hole (not illustrated) of the support portion 425. Accordingly, the first bearing 423 and the second bearing 424 are rotatable together with the coupling gear 6.

The insertion member 426 has one end portion having a head portion 426A and another end portion having an annular groove 426B. A stopper 429 is fitted into the groove 426B in a state where the insertion member 426 is inserted through the first through-hole 430 of the first bearing 423, the first through-hole 430 of the second bearing 424, and the through-hole (not illustrated) of the support portion 425. As a result, the insertion member 426 is prevented from being removed from the first through-hole 430 of the first bearing 423, the first through-hole 430 of the second bearing 424, and the through-hole (not illustrated) of the support portion 425.

The first bearing 423 further has a second through-hole 431 positioned at one end portion of the first bearing 423 in the first direction and penetrating the same in the second direction. Similarly, the second bearing 424 has a second through-hole 431.

The first shaft 421 is inserted through the second through-hole 431 of the first bearing 423. Thus, the first shaft 421 is supported by the first bearing 423. The second shaft 422 is inserted through the second through-hole 431 of the second bearing 424. Thus, the second shaft 422 is supported by the second bearing 424. Consequently, the joint 407 is pivotally movable about the first shaft 421 and the second shaft 422 relative to the coupling gear 6.

[Modifications]

Figure 17A:
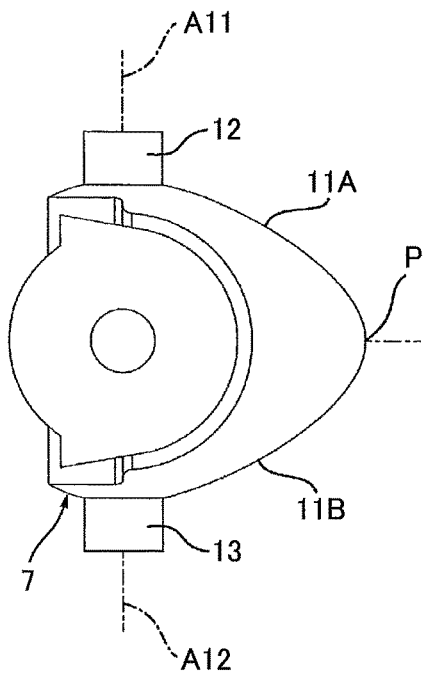
FIG. 17A is a view illustrating a joint according to a first modification, in which the joint has a conical shape.
Figure 17B:
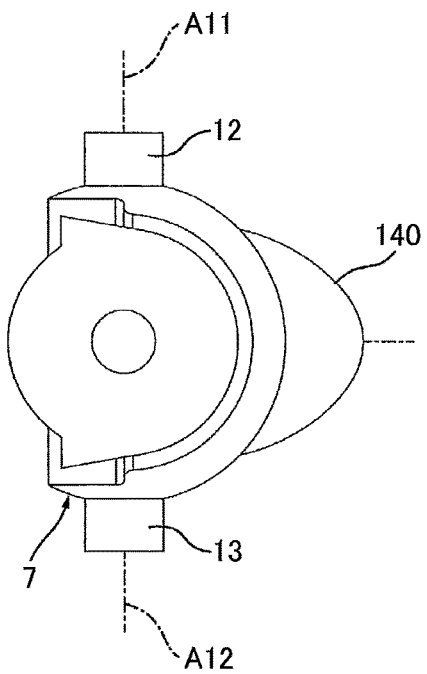
FIG. 17B is a view illustrating a joint according to a second modification, in which the joint has a protruding plate.
Figure 17C:
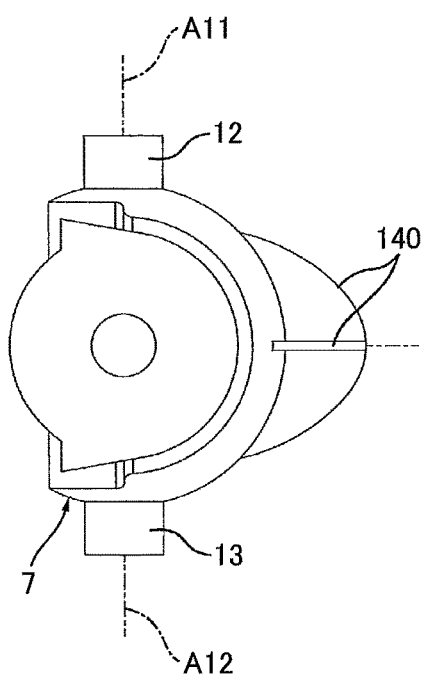
FIG. 17C is a view illustrating a joint according to a third modification, in which the joint has two protruding plates crossing each other.
Figure 17D:
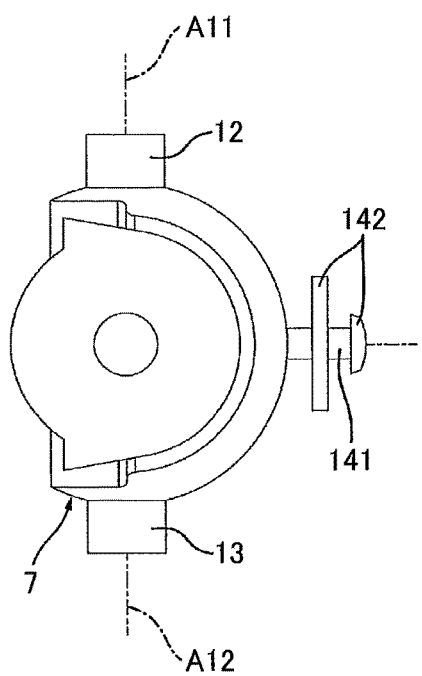
FIG. 17D is a view illustrating a joint according to a fourth modification, in which the joint has a protruding rod and plates extending from the rod.

Various modifications are conceivable. For example, in the above-described embodiments, the joint has a spherical shape. However, a joint may have a conical shape as illustrated in FIGS. 8B and 17A. Alternatively, as illustrated in FIGS. 17B and 17C, the joint may include a plate(s) 140 protruding in the first direction. Still alternatively, as illustrated in FIG. 17D, the joint may include a rod 141 protruding in the first direction and plates 142 extending in a radial direction of the rod 141.

Further, according to the embodiments described above, the first bearing and the second bearing support the shaft by inserting the shaft into the through-holes of the first bearing and the second bearing. However, instead of the through-holes, the first bearing and second bearing may have a recess for receiving each end portion of the shaft.

[Modifications to Main Body Coupling 8]

Modifications of configuration of the main body coupling 8 will next be described.

Figure 18:
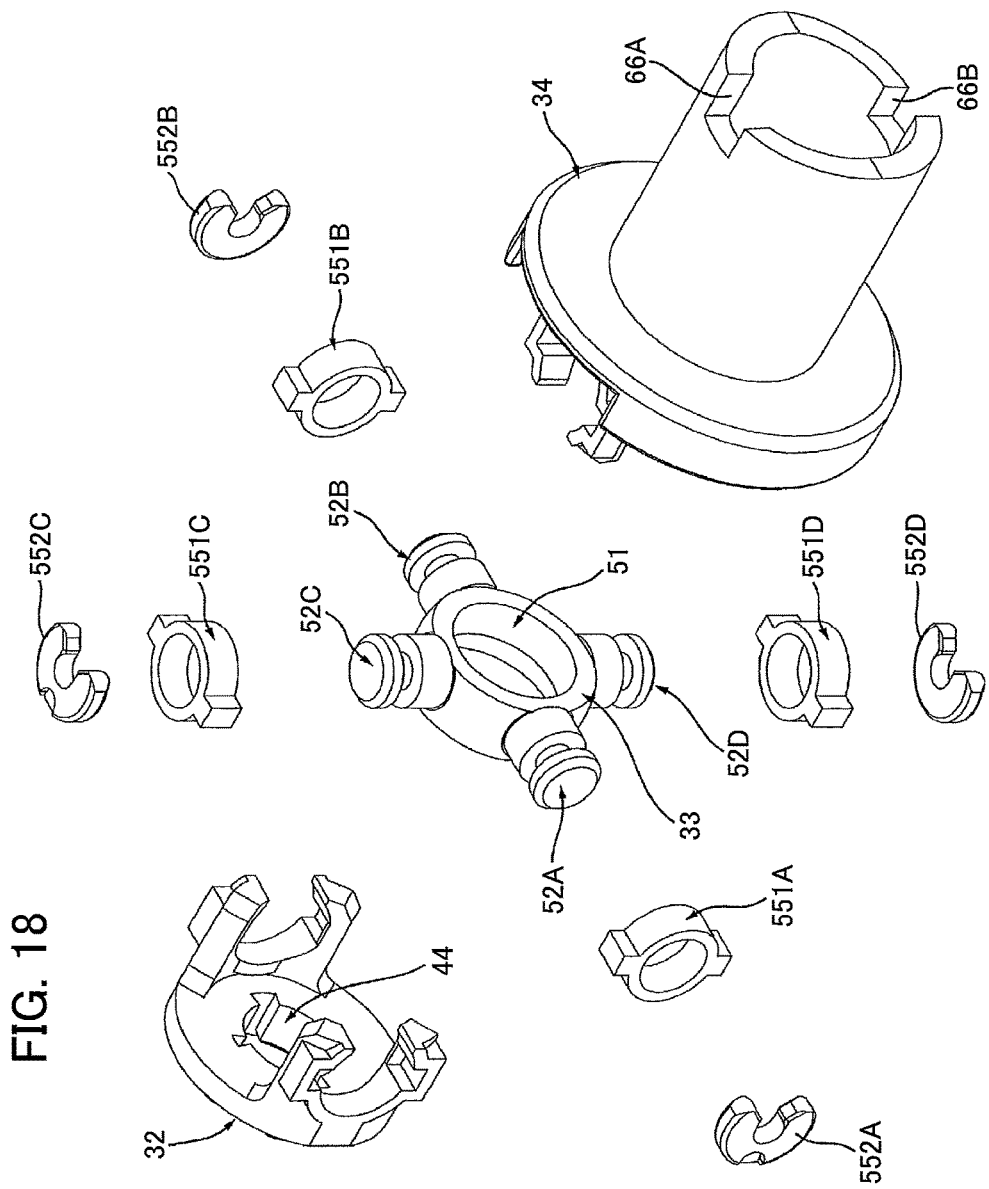
FIG. 18 is an exploded perspective view of a main body coupling according to a first modification.

As a first modification illustrated in FIG. 18, the main body coupling 8 may include stoppers 552A, 552B, 552C, and 552D for preventing bearings 551A, 551B, 551C, and 551D from removing from the shafts 52A, 52B, 52C, and 52D, respectively.

Figure 19:
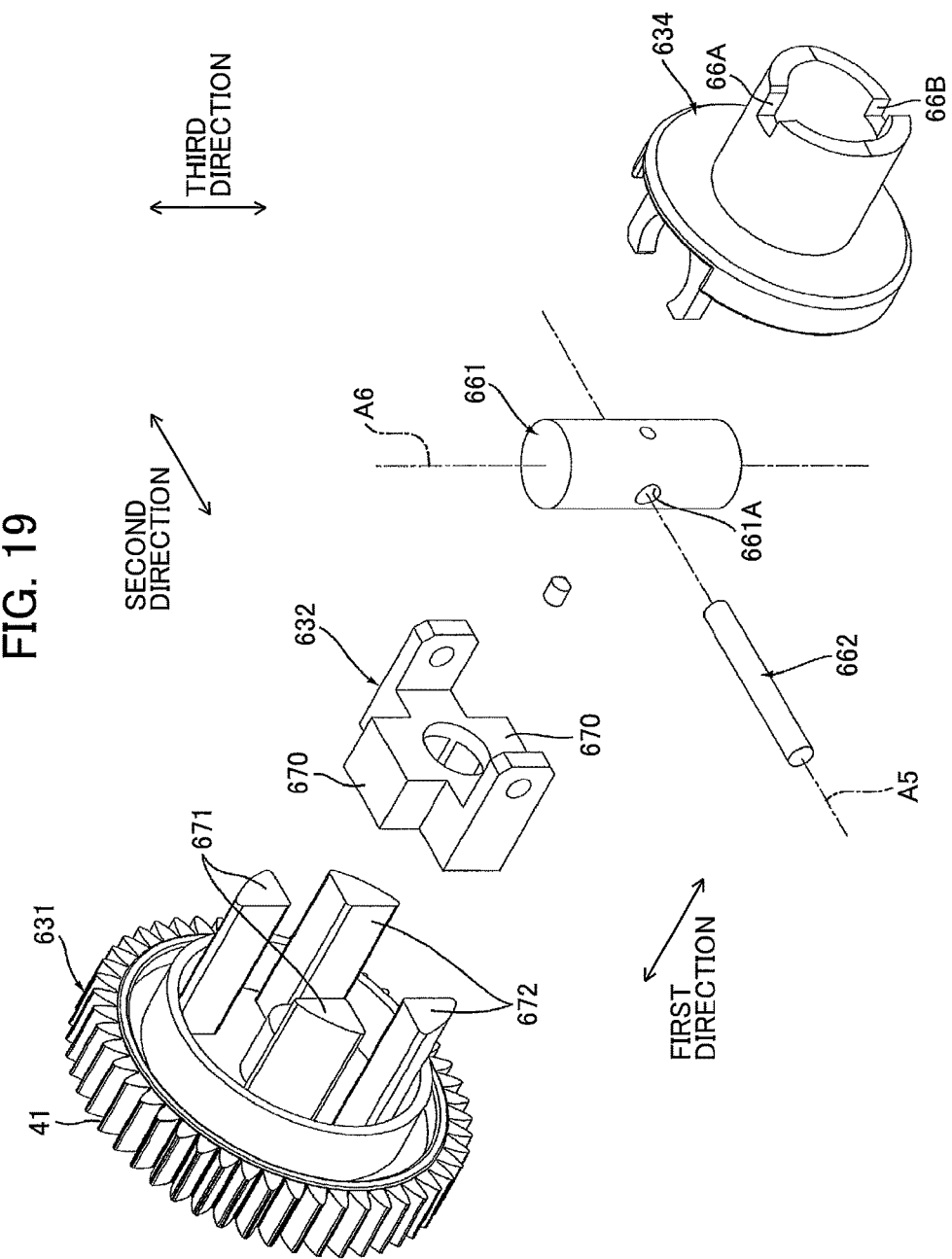
FIG. 19 is an exploded perspective view of a main body coupling according to a second modification.

Alternatively, as a second modification illustrated in FIG. 19, a driving force transmission member 631 includes two first protrusions 671 and two second protruding protrusions 672, instead of the shaft 42 (see FIG. 9) according to the embodiments described above.

Each of the two first protrusions 671 protrudes from the gear portion 41 in the first direction toward the second joint 634. The two first protrusions 671 are positioned away from each other in the second direction.

The two second protrusions 672 are positioned away from the two first protrusions 671 in the third direction. Each of the two second protrusions 672 protrudes from the gear portion 41 in the first direction toward the second joint 634. The two second protrusions 672 are positioned away from each other in the second direction.

A first joint 632 includes two protrusions 670. One protrusion 670 is fitted with a portion between the two first protrusions 671, and the remaining protrusion 670 is fitted with a portion between the two protrusions 672. Hence, the first joint 632 is rotatable together with the driving force transmission member 631.

Further, in the second modification illustrated in FIG. 19, the main body coupling 8 includes a first shaft 661, and a second shaft 662 extending through the first shaft 661, instead of the second joint 33 of the embodiments.

The first shaft 661 extends along the fifth axis A5, and has a solid cylindrical shape. The first shaft 661 has a first through-hole 661A. The first through-hole 661A is positioned at a center portion of the first shaft 661 in the third direction. The first through-hole 161A penetrating the first shaft 661 in the second direction.

The second shaft 662 extends along the fifth axis A5, and has a solid cylindrical shape. The second shaft 662 is inserted through the first through-hole 661A.

The second joint 634 is attached to the first shaft 661, and the first joint 632 is attached to the second shaft 662. Since the second joint 634 is attached to the first shaft 661, the second joint 634 is pivotally movable about the sixth axis A6. Further, since the first joint 632 is attached to the second shaft 662, the first joint 632 is pivotally movable about the fifth axis A5. With this configuration, a universal joint including the first shaft 661 and the second shaft 662 can function as an eccentric coupling.

Figure 20:
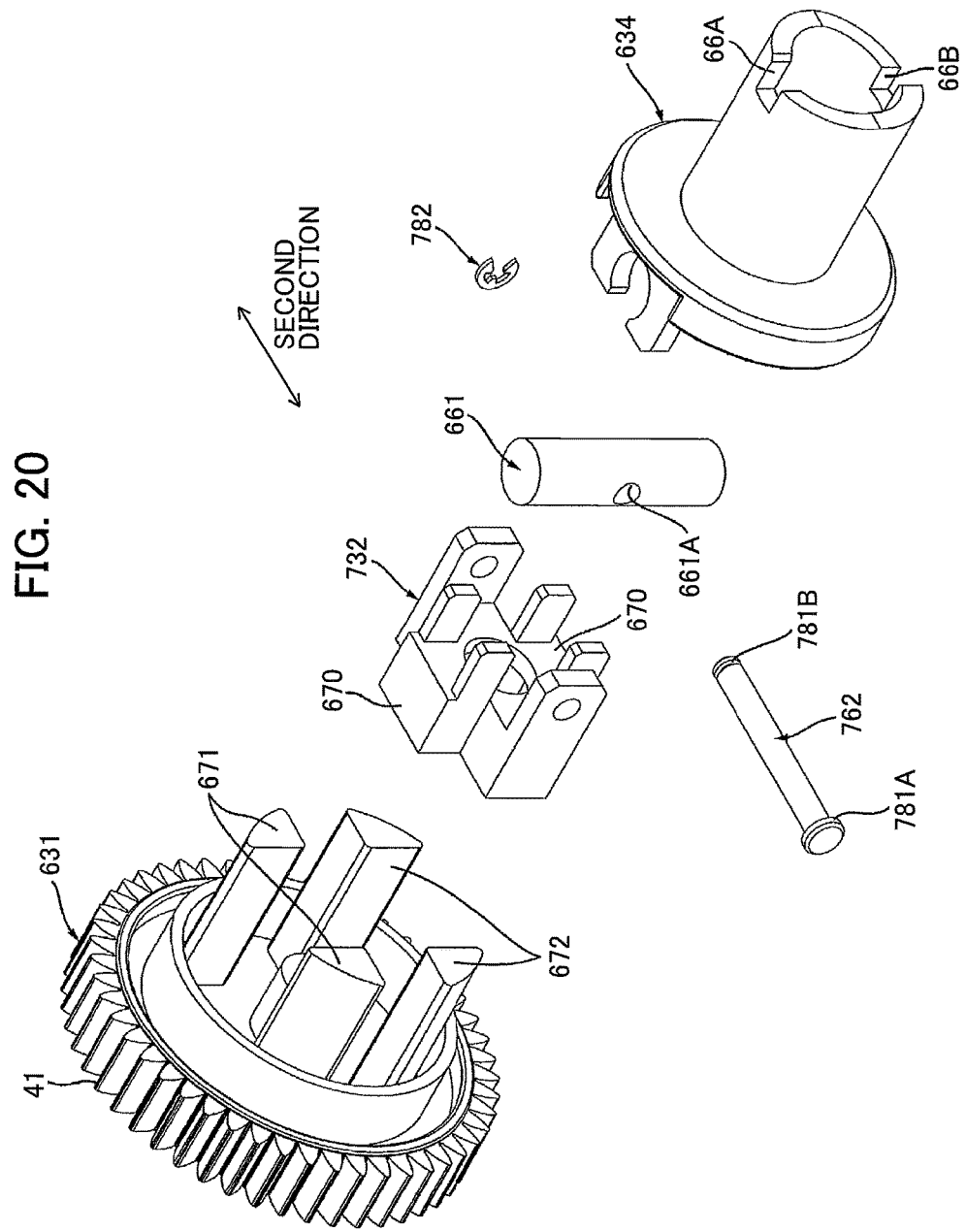
FIG. 20 is an exploded perspective view of a main body coupling according to a third modification.

Still alternatively, as a third modification illustrated in FIG. 20, a second shaft 762 has one end portion in the second direction including a head portion 781A, and another end portion in the second direction having an annular groove 781B. The head portion 781A faces a first joint 732 in the second direction in a state where the first joint 732 is assembled to the second shaft 762. A stopper 782 is fitted with the annular groove 781B at a position opposite to the head portion 781A with respect to the first joint 732. The stopper 782 faces the first joint 732 in the second direction. Since the first joint 732 is interposed between the head portion 781A and the stopper 782 in the second direction, unintentional removal of the first joint 732 from the second shaft 762 can be prevented.

While the description has been made in detail with reference to the embodiments thereof, it would be apparent to those skilled in the art that many modifications and variations may be made therein without departing from the spirit of the disclosure.

What is claimed is:

1. A developing cartridge comprising:
    a developing roller rotatable about a first axis extending in a first direction, the developing roller including one end portion in the first direction;
    a developing roller gear positioned at the one end portion of the developing roller and rotatable together with the developing roller;
    a coupling gear rotatable about a second axis extending in the first direction, the coupling gear meshingly engaging with the developing roller gear; and
    a joint rotatable together with the coupling gear and positioned opposite to the developing roller with respect to the coupling gear in the first direction, the joint being pivotally movable relative to the coupling gear about a third axis extending in a second direction, the joint including:
        a first protrusion extending in a first radial direction of the coupling gear; and
        a second protrusion positioned away from the first protrusion and aligned with the first protrusion in a diametrical direction of the coupling gear, the second protrusion extending in a second radial direction of the coupling gear, the second radial direction being directed to a direction opposite to the first radial direction, the diametrical direction including the first radial direction and the second radial direction, the second direction crossing the first radial direction and the second radial direction,
    wherein the joint has a first outer surface and a second outer surface,
    wherein the first protrusion is positioned at the first outer surface,
    wherein the second protrusion is positioned at the second outer surface,
    wherein the first protrusion extends outward in the diametrical direction of the coupling gear from the first outer surface, and
    wherein the second protrusion extends outward in the diametrical direction of the coupling gear from the second outer surface.

2. The developing cartridge according to claim 1, wherein each of the first radial direction and the second radial direction is perpendicular to the second direction.

3. The developing cartridge according to claim 1, further comprising:
    a shaft extending in the second direction and along the third axis, the shaft including one end portion and another end portion in the second direction;
    a first bearing rotatable together with the coupling gear and positioned opposite to the developing roller with respect to the coupling gear in the first direction, the first bearing receiving the one end portion of the shaft; and
    a second bearing rotatable together with the coupling gear, the second bearing being positioned opposite to the developing roller with respect to the coupling gear in the first direction and positioned away from the first bearing in the second direction, the second bearing receiving the another end portion of the shaft,
    wherein the joint is pivotally movable about the shaft.

4. The developing cartridge according to claim 3, wherein the joint has a through-hole extending in the second direction and allowing the shaft to extend therethrough.

5. The developing cartridge according to claim 1, further comprising:
    a first shaft extending from the joint in the second direction and along the third axis;
    a second shaft extending from the joint in a direction opposite to the first shaft in the second direction and along the third axis;

a first bearing rotatable together with the coupling gear and positioned opposite to the developing roller with respect to the coupling gear in the first direction, the first bearing receiving the first shaft; and a second bearing rotatable together with the coupling gear, the second bearing being positioned opposite to the developing roller with respect to the coupling gear in the first direction and positioned away from the first bearing in the second direction, the second bearing receiving the second shaft, wherein the joint is pivotally movable about the first shaft and the second shaft.

6. An image forming apparatus to which the developing cartridge according to claim 1 is detachably attached, the image forming apparatus comprising:

a second joint connectable to the joint of the developing cartridge and rotatable together with the joint, the second joint including:
 a first recess into which the first protrusion of the developing cartridge is fitted; and
 a second recess into which the second protrusion of the developing cartridge is fitted;

a universal joint rotatable upon rotation of the second joint; and a driving force transmission member configured to transmit driving power for rotating the universal joint.

7. A developing cartridge comprising:

a developing roller rotatable about a first axis extending in a first direction, the developing roller including one end portion in the first direction;

a developing roller gear positioned at the one end portion of the developing roller and rotatable together with the developing roller;

a coupling gear rotatable about a second axis extending in the first direction, the coupling gear meshingly engaging with the developing roller gear; and a joint rotatable together with the coupling gear and positioned opposite to the developing roller with respect to the coupling gear in the first direction, the joint being pivotally movable relative to the coupling gear about a third axis extending in a second direction, the joint including:
 a first protrusion extending in a first radial direction of the coupling gear; and
 a second protrusion positioned away from the first protrusion and aligned with the first protrusion in a diametrical direction of the coupling gear, the second protrusion extending in a second radial direction of the coupling gear, the second radial direction being directed to a direction opposite to the first radial direction, the diametrical direction including the first radial direction and the second radial direction, the second direction crossing the first radial direction and the second radial direction, wherein the joint has:
 a distal end positioned away from the first protrusion in the first direction and positioned opposite to the developing roller with respect to the coupling gear in the first direction;
 a third outer surface extending from the distal end toward the first protrusion; and
 a fourth outer surface extending from the distal end toward the second protrusion.

8. The developing cartridge according to claim 7, wherein the third outer surface is configured to guide a second joint of an image forming apparatus toward the first protrusion, and wherein the fourth outer surface is configured to guide the second joint toward the second protrusion.

9. The developing cartridge according to claim 7, wherein each of the third outer surface and the fourth outer surface is a spherical surface.

10. The developing cartridge according to claim 9, wherein an angle between a first imaginary line and a center axis of the first protrusion is 90 degrees, the first imaginary line being perpendicular to a tangential line tangent to the third outer surface and passing through the third axis, and wherein an angle between a second imaginary line and a center axis of the second protrusion is 90 degrees, the second imaginary line being perpendicular to a tangential line tangent to the fourth outer surface and passing through the third axis.

11. The developing cartridge according to claim 10, wherein a diameter of each of the third outer surface and the fourth outer surface is 10.8 mm.

* * * * *